US010108348B2

(12) United States Patent
Yang

(10) Patent No.: US 10,108,348 B2
(45) Date of Patent: Oct. 23, 2018

(54) STORAGE OF DATA REFERENCE BLOCKS AND DELTAS IN DIFFERENT STORAGE DEVICES

(71) Applicant: HGST Netherlands B.V., Amsterdam (NL)

(72) Inventor: Qing Yang, Saunderstwon, RI (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/882,741

(22) Filed: Oct. 14, 2015

(65) Prior Publication Data

US 2016/0110118 A1    Apr. 21, 2016

Related U.S. Application Data

(63) Continuation of application No. 12/762,993, filed on Apr. 19, 2010, now Pat. No. 9,176,883.

(Continued)

(51) Int. Cl.
*G06F 3/06* (2006.01)
*G06F 12/08* (2016.01)
*G06F 12/0868* (2016.01)

(52) U.S. Cl.
CPC ............ *G06F 3/0611* (2013.01); *G06F 3/068* (2013.01); *G06F 3/0613* (2013.01);
(Continued)

(58) Field of Classification Search
CPC ..... G06F 3/0611; G06F 3/0659; G06F 3/0685
See application file for complete search history.

(56) References Cited

U.S. PATENT DOCUMENTS 5,353,430 A    10/1994  Lautzenheiser
5,379,393 A    1/1995   Yang
(Continued)

FOREIGN PATENT DOCUMENTS

WO    WO-2012109145    8/2012

OTHER PUBLICATIONS

D. Gupta, S. Lee, M. Vrable, S. Savage, A. Snoeren, G. Varghese, G. voelker, and A. Vandat, "Difference engine: Harnessing memory redundancy in virtual machines," in Proc. of 8th USENIX Symposium on Operating Systems Design and Implementation, 2008.*

(Continued)

*Primary Examiner* — Michael Alsip
(74) *Attorney, Agent, or Firm* — Morgan, Lewis & Bockius LLP

(57) ABSTRACT

A data storage architecture is composed of an array of a flash memory solid state disk and a hard disk drive or any nonvolatile random access storage that are intelligently coupled by an intelligent processing unit such as a multi-core graphic processing unit. The solid state disk stores seldom-changed and mostly read reference data blocks while the hard disk drive stores compressed deltas between currently accessed I/O blocks and their corresponding reference blocks in the solid state disk so that random writes are not performed on the solid state disk during online I/O operations. The solid state disk and hard disk drive are controlled by the intelligent processing unit, which carries out high speed computations including similarity detection and delta compression/decompression. The architecture exploits the fast read performance of solid state disks and the high speed computation of graphic processing units to replace mechanical operations on hard disk drives while avoiding slow and wearing solid state drive writes.

20 Claims, 14 Drawing Sheets

Related U.S. Application Data

(60) Provisional application No. 61/174,166, filed on Apr. 30, 2009.

(52) U.S. Cl.
CPC .......... G06F 3/0616 (2013.01); G06F 3/0659 (2013.01); G06F 3/0685 (2013.01); G06F 12/0868 (2013.01); *G06F 2212/214* (2013.01); *Y02D 10/13* (2018.01)

(56) References Cited

U.S. PATENT DOCUMENTS

| | | | |
|---|---|---|---|
| 5,754,888 | A | 5/1998 | Yang et al. |
| 6,216,199 | B1 | 4/2001 | DeKoning et al. |
| 6,243,795 | B1 | 6/2001 | Yang et al. |
| 6,789,156 | B1 | 9/2004 | Waldspurger |
| 7,457,980 | B2 | 11/2008 | Yang et al. |
| 7,730,347 | B1 | 6/2010 | Yang |
| 8,549,222 | B1 | 10/2013 | Kleiman et al. |
| 8,806,641 | B1 | 8/2014 | Li et al. |
| 9,176,883 | B2 | 11/2015 | Yang |
| 9,413,527 | B2 | 8/2016 | Yang et al. |
| 9,582,222 | B2 | 2/2017 | Yang et al. |
| 2003/0098987 | A1 | 5/2003 | Fiske |
| 2006/0218498 | A1 | 9/2006 | Henderson et al. |
| 2007/0008330 | A1 | 1/2007 | Xu |
| 2007/0124552 | A1 | 5/2007 | Chen |
| 2007/0208703 | A1 | 9/2007 | Shi et al. |
| 2008/0005489 | A1 | 1/2008 | Watkins et al. |
| 2008/0044016 | A1 | 2/2008 | Henzinger |
| 2010/0042776 | A1 | 2/2010 | Seo et al. |
| 2010/0088459 | A1* | 4/2010 | Arya ............... G06F 3/061 711/103 |
| 2010/0281208 | A1 | 11/2010 | Yang |
| 2012/0137059 | A1 | 5/2012 | Yang et al. |
| 2012/0137061 | A1 | 5/2012 | Yang et al. |
| 2012/0144098 | A1 | 6/2012 | Yang et al. |
| 2012/0144099 | A1 | 6/2012 | Yang et al. |
| 2014/0247963 | A1 | 9/2014 | Lin et al. |
| 2015/0010143 | A1 | 1/2015 | Yang |
| 2015/0067839 | A1 | 3/2015 | Wardman et al. |
| 2016/0224595 | A1 | 8/2016 | Bandic et al. |
| 2017/0052895 | A1 | 2/2017 | Yang et al. |

OTHER PUBLICATIONS

AMD, ATI RadeonTM HD 4800 Series Graphics, 8 http://www.amd.com/la/products/desktop/graphics/ati-radeon-hd-4000/hd-4800/Pages/atiradeon-hd-4800-overview.aspx, 1 page. [accessed Aug. 30, 2013].

Bansal et al., "CAR: Clock with Adaptive Replacement", Proceedings of the 9 Third USENIX Conference on File and Storage Technologies, San Francisco, CA, USA, Mar. 31-Apr. 2, 2004, 15 pages.

Bellard, "QEMU, a Fast and Portable Dynamic Translator", Proceedings of 10 the 2005 USENIX Annual Technical Conference, Anaheim, CA, USA, Apr. 10-15, 2005, pp. 41-46.

Bityutskiy, "JFFS3 design issues", http://www.linux-mtd.infradead.org/tech/JFFS3design.pdf (accessed May 2, 2013), Version 0.32 (draft), Nov. 27, 2005, 36 pages.

Boboila et al., "Write Endurance in Flash Drives: Measurements and Analysis," Proceedings of the 8th USENIX Conference on File and Storage Technologies, (FAST'10) San Jose, California, 14 pages (2010).

Borthakur, "The Hadoop Distributed File System: Architecture and Design", The Apache Software Foundation, http://hadoop.apache.org/docs/r0.18.0/hdfs_design.pdf(accessed on May 6, 2013), 14 pages (2007).

Breitinger et al., "FRASH: A framework to test algorithms of similarity hashing," 13th annual Digital Forensics Research Conference, pp. S50-S58 (2013).

Calder et al., "Selective Value Prediction", Proceedings of the 26th International Symposium on Computer Architecture (ISCA'99), 11 pages (1999).

Cecchet et al., "Performance and scalability of EJB applications", Proceedings of the 17th ACM Conference on Object-oriented programming, systems, languages, and applications, New York, NY, USA, 10 pages (2002).

Claburn, "Google Plans to Use Intel SSD Storage in Servers," www.informationweek.com/storage/systems/google-plans-to-use-intel-ssd-storage-in/207602745 (accessed online May 2, 2013), 3 pages (2008).

Clements et al., "Decentralized Deduplication in SAN Cluster File Systems," Proceedings of the 2009 conference on USENIX Annual technical conference (USENIX'09). Usenix Association, Berkeley, CA, USA, 14 pages (2009).

Corbato, "A Paging Experiment with the Multics System", Chapter 19, in Honor of P.M. Morse, pp. 217-228, MIT Press, 1969. Also as MIT Project MAC Report MAC-M-384, May 1968.

Debnath et al., "ChunkStash: Speeding up Inline Storage Deduplication using Flash Memory," Proceedings of the 2010 USENIX Annual Technical Conference, Boston, Massachusetts, 15 pages (2010).

"Dell Poweredge 1950 server specification sheet" http://www.dell.com/downloads/emea/products/pedge/en/PE1950Spec_Sheet_Quad.pdf 2 pages (2006).

Dirik et al., "The Performance of PC Solid-State Disks (SSDs) as a Function of Bandwidth, Concurrency, Device Architecture, and System Organization," ISCA'09, Austin, Texas, USA, pp. 279-289 (2009).

Douglis et al., "Application-specific Delta-encoding via Resemblance Detection," USENIX 2003 Annual Technical Conference, San Antonio, Texas, 14 pages (2003).

Forman et al., "Efficient Detection of Large Scale Redundancy in Enterprise File Systems," SIGOPS Oper. Syst. Rev. 43, 9 pages (2009).

Fusion-10, "ioDrive Data Sheet", http://www.fusionio.com/load/-media-/24dr4d/docslibrary/FIO_DS_ioDrive.pdf, 1 page (2013).

Gabbay et al., "Can Program Profiling Support Value Prediction?" Proceedings of the 30th annual ACM/IEEE international symposium on Microarchitecture, 12 pages (1997).

Gomez et al., "Characterizing Temporal Locality in 1/0 Workload," Proceedings of the 2002 International Symposium on Performance Evaluation of Computer and Telecommunications Systems (SPECTS 2002), San Diego, California, 11 pages (2002).

Grupp, "Characterizing Flash Memory: Anomalies, Observations, and Applications," MICR0'09, New York, NY, USA, 10 pages (2009).

Heintze, "Scalable Document Fingerprinting (Extended Abstract)," Proc. USENIX Workshop on Electronic Commerce, 10 pages (1996).

Hsu et al., "The automatic improvement of locality in storage systems," ACM Transactions on Computer Systems 23:4 pp. 424-473 (2005).

Hu et al., "DCD—Disk Caching Disk: A New Approach for Boosting 1/0 Performance," Proceedings of the 23rd Annual International Symposium on Computer Architecture (ISCA'96), Philadelphia, PA, 11 pages (1996).

Huang et al., "Exploiting Basic Block Value Locality with Block Reuse," Proceedings of the Fifth International Symposium on High-Performance Computer Architecture, pp. 1-25 (1998).

Intel, "What is an Intel® Solid-State Drive, Overview," http://web.archive.org/web/20100724065039/http:1/www.intel.com/design/flash/nand/overview.htm [accessed on Sep. 3, 2013], 2 pages (2010).

International Preliminary Report on Patentability and Written Opinion for International Patent Application No. PCT/US2012/023972, dated Aug. 22, 2013 (5 pages).

Jaleel et al., "High Performance Cache Replacement Using Re-Reference Interval Prediction (RRIP)," International Symposium on Computer Architecture (ISCA), Saint-Malo, France, 12 pages (2010).

Jiang et al., "CLOCK-Pro: An Effective Improvement of the CLOCK Replacement," Proceedings of the USENIX Annual Technical Conference, pp. 323-336 (2005).

(56) References Cited

OTHER PUBLICATIONS

Jiang et al., "DULO: An Effective Buffer Cache Management Scheme to Exploit Both," FAST'05: 4th USENIX Conference on File and Storage Technologies, pp. 101-114 (2005).
Jiang, "LIRS: An Efficient Low Inter-reference Recency Set Replacement Policy to Improve Buffer Cache Performance," Proceedings of the 2002 ACM SIGMETRICS international conference on Measurement and modeling of computer systems (SIGMETRICS '02), New York, NY, USA, pp. 31-42 (2002).
Joglekar, "A Scalable and High Performance Software iSCSI Implementation," FAST'05, Proceedings of the 4th USENIX Conference on File and Storage Technologies, pp. 267-280 (2005).
Johnson et al., "20: A Low Overhead High Performance Buffer Management eplacement Algorithm", Proceedings of the 20th VLDB Conference, Santiago, Chile, pp. 439-450 (1994).
Josephson et al., "DFS: A File System for Virtualized Flash Storage," FAST'10: Proc. of the Eighth USENIX Conf. on File and Storage Technologies, 15 pages (2010).
Koller et al., "I/O Deduplication: Utilizing Content Similarity to Improve I/0 Performance," ACM Transactions on Storage (TOS), vol. 6 Issue 3, Article No. 13, pp. 1-14 (2010).
Kopytov, A System Performance Benchmark, SysBench, http://sysbench.sourceforge.net/index.html (accessed Jul. 30, 2013), 2 pages (2004).
Kounavis et al., "A Systematic Approach to Building High Performance Software-based CRC Generators," Proceedings of the 10th IEEE Symposium on Computers and Communications (ISCC 2005), pp. 855-862 (2005).
Kruus et al., "Bimodal Content Defined Chunking for Backup Streams," FAST'10 Proceedings of the 8th USENIX conference on File and storage technologies, 14 pages (2010).
Lee et al., "LRFU: A Spectrum of Policies that Subsumes the Least Recently Used and Least Frequently Used Policies," IEEE Transactions on Computers, 50:12 pp. 1352-1361 (2001).
Lee et al., "A Case for Flash Memory SSD in Enterprise Database Applications Applications," Proc. ACM SIGMOD International Conference on Management of Data (SIGMOD), Vancouver, BC, Canada, pp. 1075-1086 (2008).
Lee et al., "Design of Flash-Based DBMS: An In-Page Logging Approach," Proceeding of the ACM/SIGMOD, Beijing. China, 12 pages (2007).
Li et al., "Theory and Application of b-Bit Minwise Hashing," Communications of the ACM (2008) 9 pages (2011).
Low, "Connectix Ram Doubler Information," http://www.lowtek.com/maxram/rd.html (accessed online May 2, 2013), 2 pages (1996).
Makatos et al., "Using Transparent Compression to Improve SSD-based I/O Caches," EuroSys'10, Paris, France, 14 pages (2010).
Manber, "Finding Similar Files in a Large File System," Proceedings of the USENIX Winter Technical Conference, https://www.usenix.org/legacy/publications/library/proceedings/sf94/full_papers/manber.finding [accessed Aug. 30, 2013], 11 pages (1994).
Manber et al., "Glimpse: A tool to search through entire file systems," Proceedings of the USENIX Winter Technical Conference, https://www.usenix.org/legacy/publications/library/proceedings/sf94/full_papers/manber.glimpse, 11 pages (1994).
Manning, "YAFFS: Yet Another Flash File System," http://web.archive.org/web/20041204092124/http:l/www.aleph 1.co.uk/yaffs/ [accessed Aug. 30, 2013], 2 pages (2004).
Megiddo et al., "ARC: A Self-Tuning, Low Overhead Replacement Cache," Proceedings of FAST'03: 2nd USENIX Conference on File and Storage Technologies, San Francisco, CA, USA, pp. 115-130 (2003).
"Mira", web.archive.org/web/20 1 01121 081223/htlp://sourceforge.net/apps/mediawiki/mira-assembler/index.php?title=Main_Page [accessed Jul. 30, 2013], 3 pages (2010).
Morrey, III, "Content-Based Block Caching," 14th NASA Goddard, 23rd IEEE (MSST2006) Conference on Mass Storage Systems and Technologies, May 15-18, 2006, http:l/storageconference.biz/2006/Papers/2006-028-Morrey.pdf (accessed May 3, 2013), College Park, Maryland, 13 pages (2006).
Narayanan et al., "Migrating Server Storage to SSDs: Snalysis of Tradeoffs," EuroSys'09, Proceedings of the 4th ACM European Conference on Computer systems, Nuremberg, Germany, pp. 145-158 (2009).
Nath et al., "FlashDB: Dynamic Self-tuning Database for NAND Flash," Proceedings of the 6th International Conference on Information Processing in Sensor Networks (IPSN'07), Cambridge, Massachusetts, USA, 10 pages (2007).
NCBI, "SRX012992," http://www.ncbi.nlm.nih.gov/sra/?term=srx012992 1 page (accessed Jul. 30, 2013).
Nicola et al., "Analysis of the Generalized Clock Buffer Replacement Scheme for Database Transaction Processing," Performance Evaluation Review, vol. 20, No. 1/Proceedings of the ACM Sigmetrics & Performance Conference '92 pp. 35-46 (1992).
Oliveira et al., "Blutopia: Stackable Storage for Cluster Management," 2007 IEEE International Conference on Cluster Computing, pp. 293-302 (2007).
O'Neil et al., "The LRU-K Page Replacement Algorithm for Database Disk Buffering," Proceedings of SIGMOD-93, pp. 297-306 (1993).
Owens et al., "A Survey of General-Purpose Computation on Graphics Hardware," Computer Graphics Forum, 26:1, pp. 80-113 (2007).
Poelker et al., "Using Data De-Duplication to Lighten the Load," Chapter 13 in Storage Area Networks for Dummies, 2nd Edition, 23 pages (2009).
Qureshi et al., "Adaptive Insertion Policies for High Performance Caching," ISCA'07, San Diego, CA, USA, 11 pages (2007).
Ren et al., "A New Buffer Cache Design Exploiting both Temporal and Content Localities," Proceedings of the 30th IEEE International Conference on Distributed Computing Systems (ICDCS), Genoa, Italy, pp. 273-282 (2010).
Ren et al., "I-CASH: Intelligently Coupled Array of SSD and HOD," IEEE 17th International Symposium on High Performance Computer Architecture (HPCA), San Antonio, TX, pp. 278-289 (2011).
Robinson et al., "Data cache management using frequency-based replacement," SIGMETRICS '90, Proceedings of the 1990 ACM SIGMETRICS Conference on Measurement and Modeling of Computer Systems, pp. 134-142 (1990).
Rosenblum et al., "The Design and Implementation of a Log-Structured File System," ACM Transactions on Computer Systems, 10:1, pp. 26-52 (1992).
Seiler et al., "Larrabee: A Many-Core x86 Architecture for Visual Computing," ACM Transactions on Graphics, vol. 27, No. 3, Article 18, 16 pages (2008).
Soundararajan et al., "Extending SSD Lifetimes with Disk-Based Write Caches," FAST'10 Proceedings of the 8th USENIX conference on File and storage technologies, 14 pages (2010).
Sun et al., "A Hybrid Solid-State Storage Architecture for the Performance, Energy, Consumption, and Lifetime Improvement," Proc. of 16th IEEE International Symposium on High-Performance Computer Architecture, 12 pages (2010).
"TPC BenchmarkTM C," Standard Specification, Revision 5.5, Transaction Processing Performance Council (TPC), http://www.tpc.org/tpcc/spec/tpcc_v5.5.pdf, 125 pages (2005).
Ungureanu et al., "HydraFS: A High-Throughput File System for the HYDRAstor Content-Addressable Storage System," 8th USENIX Conference on File and Storage Technologies, 14 pages (2010).
Wu et al., "eNVy: A Non-Volatile, Main Memory Storage System," Proc. of 6th International Conference on Architectural Support for Programming Languages and Operating Systems, 12 pages (1994).
Xie et al., "SAIL: Self-Adaptive File Teallocation on Hybrid Disk Arrays," HiPC 2008, LNCS 5374, pp. 529-540 (2008).
Xie et al., "PIPP: Promotion/Insertion Pseudo-Partitioning of Multi-Core Shared Caches," Proceedings of the 36th ACM/IEEE International Symposium on Computer Architecture (ISCA'09), Austin, Texas, USA, 10 pages (2009).
Yang, "Introducing a New Cache Design into Vector Computers," IEEE Transactions on Computers, 42:2, 24 pages (1993).
Yang et al., "TRAP-Array: A Disk Array Architecture Providing Timely Recovery to Any Point-in-time," Proceedings of the 33rd

(56) References Cited

OTHER PUBLICATIONS annual international symposium on Computer Architecture (ISCA '06) IEEE Computer Society, Washington, DC, USA, 12 pages (2006).
Zhou et al., "Second-Level Buffer Cache Management," IEEE Transactions on Parallel and Distributed Systems, 15:7, pp. 1-15 (2004).
Zhu et al., "Avoiding the Disk Bottleneck in the Data Domain Deduplication File System," FAST'08 Proc. of the 6th USENIX Conference on File and Storage Technologies, San Jose, CA, pp. 269-282 (2008).
Zinman, "Simulating Stress for your Exchange 2003 Hardware using LoadSim 2003," http://www.msexchange.org/articles-tutorials/exchange-server-2003/tools/Simulating-Stress-Exchange-2003-LoadSim.html, 15 pages, ( 2 004).
Zhang, et al., "Frequent Value Locality and Value-CentricData Cache Design", ASPLOS IX Proceedings of the Ninth International Conference on Architectural Support for Programming Languages and Operting Systems, ACM SIGARCH, 28(5):150-159, Dec. 2000, 12 pages.
Gupta et al., "Difference engine: Harnessing memory redundancy in virtual machines," Symposium on Operating Systems Design and Implementation in Proc. of 8th USENIX, pp. 309-322 (2008).
Waldspurger, "Memory Resource Management in Vmware Esx Server," In *Proc. Fifth Symposium on Operating Systems Design and Implementation (OSDI '02)* 14 pages (2002).
Agrawal et al., "Design Tradeoffs for SSD Performance", USENIX '08, USENIX Annual Technical Conference, pp. 57-70 (2008).
Ajtai et al., "Compactly Encoding Unstructured Inputs with Differential Compression," Journal of the ACM, vol. 49, No. 3, pp. 318-367 (2002).
Bairavasundaram et al., "X-RAY: A Non-Invasive Exclusive Caching Mechanism for RAIDs," Proceedings of the 31st Annual International Symposium on Computer Architecture (ISCA '04), 36 pages (2004).
Bhadkamkar et al., "BORG: Block-reORGanization for Self-optimizing Storage Systems", USENIX Association, 7th USENIX Conference on File and Storage Technologies, pp. 183-196 (2009).
Birrell et al., "A Design for High-Performance Flash Disks," Microsoft Research, vol. 41, No. 2, pp. 88-93 (2007).
Broder, Andrei Z., "Identifying and Filtering Near-Duplicate Documents," Proceedings of the 11th Annual Symposium on Combinatorial Pattern Matching, Springer-Verlag Berlin Heidelberg, pp. 1-10 (2000).
Broder, Andrei Z., "On the resemblance and containment of documents," IEEE, pp. 21-29 (1998).
Bucy et al., "The DiskSim Simulation Environment Version 4.0 Reference Manual," Parallel Data Laboratory, Carnegie Mellon University, 94 pages (2008).
Carrera et al., "Conserving Disk Energy in Network Servers," ACM 17th annual international conference on Supercomputing, Presented by Hsu Hao Chen, 20 pages (2006).
Carrera et al., "Conserving Disk Energy in Network Servers," ICS'03, 2003 ACM, Jun. 23-26, 2003, pp. 86-97.
Chang et al., "Efficient Management for Large-Scale Flash-Memory Storage Systems with Resource Conservation," ACM Transactions on Storage, vol. 1, No. 4, Nov. 2005, pp. 381-418.
Chen et al., "Managing Server Energy and Operational Costs in Hosting Centers," SIGMETRICS'05, Copyright 2005 ACM, Jun. 6-10, 2005, 12 pages.
Chu et al., "Green Storage II: Metrics and Measurement," Storage Networking Industry Association (SNIA), http://www.snia.org/sites/default/education/tutorials/2008/fall/green_storage/PatrickChuGreen_Storage_Metrics_final.pdf, 31 pages (2008).
Commike, Alan, "Maximizing GPGPU computing for embedded systems," http://mil-embedded.com/articles/maximizing-gpgpu-computing-embedded-systems/, Feb. 10, 2009, 6 pages.
Cooke, Jim, "Flash Memory Technology Direction," Microsoft WinHec, 61 pages (2007).
Curry et al., "Using GPUs to Enable Highly Reliable Embedded Storage," High Performance Embedded Computing (HPEC) Workshop, Sep. 23-25, 16 pages (2008).
Douglis, Fred, "The Compression Cache: Using On-line Compression to Extend Physical Memory", 1993 Winter USENIX Conference, January pp. 1-16 (1993).
Flouris et al., "Clotho: Transparent Data Versioning at the Block 1/0 Level," NASA/IEEE MSST 2004, Apr. 13-16, 2004, pp. 1-32.
Gal et al., "A Transactional Flash File System for Microcontrollers," USENIX Association, USENIX Annual Technical Conference, Jun. 24, 2005, 13 pages.
GVS "Power Consumption and Thermal Output (BTU) Information for GVS9000 and Nomadic Products," Grand Vitesse Systems 2008, http://www.gvsnet.com/spec.html, 3 pages (2008).
Hensbergen et al., "Biutopia Stackable Storage for Cluster Management," IBM Research, IEEE Cluster 2007, Sep. 19, 2007, pp. 1-26.
Houston, Mike, "General Purpose Computation on Graphics Processors (GPGPU)," Stanford University Graphics Lab, http://graphics.stanford.edu/'mhouston/public_talks/R520-mhouston.pdf, pp. 1-38 (2005).
Hsu et al., "The Automatic Improvement of Locality in Storage Systems," Computer Science . Division (EECS), Report No. UCB/CSD-03-1264, Jul. 2003, 44 pages.
Jiang et al., "Coordinated Multilevel Buffer Cache Management with Consistent Access Locality Quantification," IEEE Transactions on Computers, vol. 56, No. 1, Jan. 2007, pp. 95-108.
Jo et al., "FAB: Flash-Aware Buffer Management Policy for Portable Media Players," vol. 52, No. 2, IEEE Transactions on Consumer Electronics, May 2006, pp. 485-493.
Kawaguchi et al., "A Flash-Memory Based File System," TCON'95 Proceedings of the US EN IX 1995 Technical Conference Proceedings, 10 pages (1995).
Kgil, Taeho, "FlashCache: A NAND Flash Memory File Cache for Low Power Web Servers," CASES'06, Copyright 2006 ACM, Oct. 23-25, pp. 103-112 (2006).
Kgil et al., "Improving NAND Flash Based Disk Caches," International Symposium on Computer Architecture, IEEE Computer Society, pp. 327-338 (2008).
Kim et al., "BPLRU: A Buffer Management Scheme for Improving Random Writes in Flash Storage," USENIX Association, FAST '08: 6th USENIX Conference on File and Storage Technologies, 14 pages (2008).
Kim, Jesung, "A Space-Efficient Flash Translation Layer for Compactflash SYSTEMS," IEEE Transactions on Consumer Electronics, vol. 48, No. 2, May 2002, pp. 366-375.
Klein, Dean A., "The Future of Memory and Storage: Closing the Gap," Microsoft WinHEC, 41 pages (2007).
Koltsidas et al., "Flashing Up the Storage Layer," VLDB Endowment, ACM, Aug. 24-30, 2008, 12 pages.
Kulkarni et al., "Redundancy Elimination Within Large Collections of Files," USENIX 2004 Annual Technical Conference, 27 pages (2004).
Lee, Hsien-Hsin S., "Larrabee: A Many-Core x86 Architecture for Visual Computing 48 from Intel," School of Electrical and Computer Engineering, Georgia Institute of Technology, pp. 1-23 (2008).
Lee et al., "Design of Flash-Based DBMS: An In-Page Logging Approach Approach," Arizona Computer Science Department, ACM SIGMOD, pp. 1-19 (2007).
Li et al., "EERAID: Energy Efficient Redundant and Inexpensive Disk Array," In 11th Proceedings of ACM SIGOPS European Workshop, pp. 1-6 (2004).
Li et al., "Second-Tier Cache Management Using Write Hints," USENIX Association, FAST '05: 4th USENIX Conference on File and Storage Technologies, pp. 115-128 (2005).
Li et al., "C-Miner: Mining Block Correlations in Storage Systems," In Proceedings of the 3rd USENIX Symposium on File and Storage Technologies (FAST '04), 37 pages (2004).
Liguori et al., "Experiences with Content Addressable Storage and Virtual Disks," In Proceedings of the Workshop on 1/0 Virtualization (WIOV'08), 6 pages (2008).

(56) References Cited

OTHER PUBLICATIONS

Lim et al., "An Efficient NAND Flash File System for Flash Memory Storage," IEEE Transactions on Computers, vol. 55, No. 7, Published by the IEEE Computer Society, Jul. 2006, pp. 1-7.
Manning, Charles, "YAFFS: the NAND-specific flash file system-Introductory Article," posted on Jul. 26, 2006 by Wookey in InternalsInformation, Originally published at Linuxdevices.org, Sep. 20, 2002, 3 pages.
Matthews et al., "Intel Turbo Memory-Nonvolatile disk caches in the storage hierarchy of mainstream computer systems," ACM Transactions on Storage, vol. 4, No. 2, Article 4, May 2008, 28 pages.
Morrey, III, Charles B., "Peabody: The Time Travelling Disk," Proceedings of the 20th IEEE/11 th NASA Goddard Conference on Mass Storage Systems and Technologies (MSS'03), 13 pages (2003).
Narayanan et al., "Migrating enterprise storage to SSDs: analysis of tradeoffs," Microsoft Research Ltd. Technical Report MSR-TR-2008-169, Nov. 11, 2008, pp. 1-12.
Nath et al., "Design Tradeoffs in Applying Content Addressable Storage to Enterprise-scale Systems Based on Virtual Machines," Proceedings of the 2006 USENIX Annual Technical Conference (USENIX '06), May-Jun. 2006, 14 pages.
Norvag et al., "Log-Only Temporal Object Storage," IEEE, Published in the Proceedings of DEXA'97, Sep. 1-2, 1997, 6 pages.
"NVIDIA CUDA Compute Unified Device Architecture," CUDA Programming Guide Version 1.1, NVIDIA Corporation, www.nvidia.com, Nov. 29, 2007, 143 pages.
Ohara et al., "IBM Research Report, Real-Time Mutual-Information-Based Linear Registration on the Cell Broadband Engine Processor," IBM Research Division, RC24138, Dec. 13, 2006, 5 pages.
Owens et al., "A Survey of General-Purpose Computation on Graphics Hardware," The Eurographics Association, State of the Art Reports, Aug. 2005, pp. 21-51.
Park, Seon-Yeong, "CFLRU: A Replacement Algorithm for Flash Memory," CASES'06, Copyright 2006 ACM, Oct. 23-25, 2006, pp. 234-241.
Patterson et al., "A Case for Redundant Arrays of Inexpensive Disks (RAID)," Copyright 1988 ACM, pp. 109-116 (1988).
Prvulovic et al., "Split Temporal/Spatial Cache: A Survey and Reevaluation of 69 Performance," In Newsletter of Technical Committee on Computer Architecture, IEEE Computer Society, Jul. 1999, pp. 1-10.
Quinlan et al., "Venti: a new approach to archival storage," Proceedings of the FAST 2002 Conference on File and Storage Technologies, USENIX Association, Jan. 28-30, 2002, 13 pages.
Reimer et al., "Opening Black Boxes: Using Semantic Information to Combat Virtual achine Image Sprawl," VEE '08, Copyright 2008 ACM, Mar. 5-7, 2008, pp. 111-120.
Rhea et al., "Fast, Inexpensive Content-Addressed Storage in Foundation," Proceedings of the 2008 USENIX Annual Technical Conference, pp. 1-14 (2008).
Ruemmler et al., "UNIX disk access patterns," 1993 Winter USENIX, Copyright Hewlett-Packard Company, Jan. 25-29, 1993, pp. 405-420.
"Samsung CEO: NAND Flash Will Replace Hard Drives," Posted by Mike Slocombe, Sep. 14, 2005, 2 pages.
Segal et al., "A Performance-Oriented Data Parallel Virtual Machine for GPUs," Copyright 2006 ATI Technologies, Inc., 6 pages (2006).
Silberstein et al., "Efficient Computation of Sum-products on GPUs Through Software-Managed Cache," ICS'08, Copyright 2008 ACM, Jun. 7-12, 2008, 10 pages.
Sivathanu et al., "Database-Aware Semantically-Smart Storage," FAST'05 Proceedings of the 4th conference on USE NIX Conference on File and Storage Technologies, vol. 4, 14 pages (2005).
Syndacast, "Quantum3D Introduces Industry-Leading Graphics Accelerator XMC: Sentirs 5140," http://pr.syndacast.com/gb/press-releases/1572-quantum3d-introduces-industry-leading-graphics-accelerator-xmc-sentirs-5140.html, May 6, 2008, 2 pages.
Tridgell, Andrew, "Efficient Algorithms for Sorting and Synchronization," A thesis submitted for the degree of Doctor of Philosophy at the Australian National University, Feb. 1999, 115 pages.
Tuduce et al., "Adaptive Main Memory Compression", USENIX Association, 2005 USENIX Annual Technical Conference, pp. 237-250 (2005).
Volkov et al., "Benchmarking GPUs to Tune Dense Linear Algebra," SC '08 81 Proceedings of the 2008 ACM/IEEE conference on Supercomputing Article No. 31, Nov. 2008, 11 pages.
Wilson, Paul R., "The Case for Compressed Caching in Virtual Memory Systems," In Proceedings of the 1999 USENIX Annual Technical Conference, 16 pages (1999).
Wong, Theodore M., "My cache or yours? Making storage more exclusive," USENIX Annual Technical Conference (USENIX 2002), Jun. 10-15, 2002, pp. 161-175.
Woodhouse, David, "JFFS: The Journalling Flash File System," Ottawa Linux Symposium (July), http://sources.redhat.com/jffs2/jffs2.pdf, 12 pages (2001).
Xiao et al., "Promise of Embedded System with GPU in Artificial Leg Control: Enabling Time-frequency Feature Extraction from Electromyography," Engineering in Medicine and Biology Society, 2009. EMBC 2009, Annual International Conference of the IEEE, Sep. 3-6, 2009, 4 pages.
Yadgar et al., "Karma: Know-it-All Replacement for a Multilevel cAche", USENIX Association, FAST '07: 5th USENIX Conference on File and Storage Technologies, pp. 169-184 (2007).
Yang et al., "A Novel Cache Design for Vector Processing," Computer Architecture, 1992 Proceedings., The 19th Annual International Symposium, pp. 1-23 (1992).
Yoder, Alan G., "Technologies for Green Storage," Storage Networking Industry Association (SNIA), 48 pages (2008).
Zhou et al., "Second-Level Buffer Cache Management," IEEE Transactions on Parallel and Distributed Systems, vol. 15, No. 6, Jun. 2004, pp. 505-519.
Zhu et al., "Hibernator: Helping Disk Arrays Sleep through the Winter," SOSP'05, Copyright 2005 ACM, Oct. 23-26, 2005, pp. 177-190.
"NVIDIA CUDA Compute Unified Device Architecture", CUDA Programming Guide Version 1.1, NVIDIA Corporation, www.nvidia.com, Nov. 29, 2007, 143 pages.
Curry et al., "Using GPUs to Enable Highly Reliable Embedded Storage", http://www.ll.mit.edu/HPEC/agendas/proc08/Day2/18-Day2-Session3-Curry-abstract.pdf, 2008, 2 pages.

\* cited by examiner

STORAGE OF DATA REFERENCE BLOCKS AND DELTAS IN DIFFERENT STORAGE DEVICES

CROSS-REFERENCE TO RELATED APPLICATION

This application is a continuation of U.S. patent application Ser. No. 12/762,993, filed Apr. 19, 2010, entitled "Storage of Data Reference Blocks and Deltas in Different Storage Devices," the contents of which are expressly incorporated by reference herein in its entirety and for all purposes. U.S. patent application Ser. No. 12/762,993 claims the benefit of U.S. Provisional Patent Application Ser. No. 61/174,166, filed on Apr. 30, 2009, the contents of which are expressly incorporated by reference herein in its entirety and for all purposes.

STATEMENT AS TO INVENTION RIGHTS UNDER FEDERALLY SPONSORED RESEARCH

This invention was made with government support under Grant No. CCF-0811333 awarded by the National Science Foundation.

BACKGROUND

While data storage capacity and central processing unit (CPU) processing power have experienced rapid growth in the past, improvement in data bandwidth and access times of disk input/output (I/O) systems have not kept pace. As a result, there is an ever-widening speed gap between CPU and disk I/O systems. Disk arrays can improve overall I/O throughput but random access latency is still very high because of mechanical operations involved. Large buffers and deep cache hierarchy can improve latency but the access time reduction has been very limited so far because of poor data locality at the disk I/O level.

Recent developments of flash memory-based solid state drives (SSD) have been very promising with rapid increase in capacity and decrease in cost. Because an SSD is on a semi-conductor chip it provides great advantages in terms of high-speed random reads, low power consumption, compact size, and shock resistance. Researchers in both academia and industry have been very enthusiastic in adopting this technology.

However, most existing research on SSDs focuses either on using an SSD in largely the same way as a hard disk drive (HDD), with various management algorithms at files system level and device level, or using an SSD as an additional cache in the storage hierarchy. The physical properties of SSDs impose constraints on both approaches that limit significant advances in the speed and reliability of disk I/O systems.

The limitations of SSDs result from their physical properties. A typical NAND-gate array flash memory chip that is widely used in SSDs consists of a number of blocks, each block containing a number of pages (e.g., a block with 64 pages of 2 KB each). Blocks are the smallest erasable units. Pages are the smallest programmable units. When a system performs a write operation it needs to first find a free page to write. If there is no free page available, an erase operation is necessary to make free pages. A read operation usually takes a few or tens of microseconds, whereas a write operation takes hundreds of microseconds and an erase operation takes from 1.5 to 3 milliseconds.

A more important limitation is imposed by the maximum number of erase operations that may be performed on a block of flash memory during the lifetime of a flash memory chip. Typically, a block can be erased for only 10K times in a multi level cell (MLC) memory element or 100K times in a single level cell (SLC) memory element. After that, the block becomes bad. For example, a block of MLC memory that is erased and reprogrammed every minute will be dead in 7 days because 60×24×7=10,080 erase operations, which exceeds the life cycle of the memory element. The lifetime of a flash memory is typically extended by wear leveling that distributes erase operations evenly across all blocks. As a result, write operations in flash memory SSDs are not done in-place as is done in HDDs and are much slower than read operations.

It is clear from the above discussions that allowing random writes to SSDs in the same way as to HDDs is not an optimal approach. Using an SSD as another level of storage cache cannot avoid random writes either. In addition, lower level storage cache provides limited performance benefits because data locality at disk I/O level is very weak. The best cache hit ratios of second level disk caches (in theoretically optimal caches with off-line caches managed manually in an optimal way) ranges from 16.5% to 86.4% for cache sizes between 16 MB and 2 GB, depending on applications.

High performance, low cost multi-core graphics processing units (GPU)/CPUs represent another dramatic technology advance. GPUs have traditionally been thought of as commodity chips to drive consumer video games. However, the push for realism in such games along with the rapid development of semiconductor technologies has made GPUs capable of supercomputing performance for many applications at very low cost. There are many low-end to medium GPU controller cards available on the market for under $100 that deliver extraordinary computation power. There has already been extensive research in using GPUs for general purpose computing (GPGPU). Besides high performance and low cost, there has also been a technology drive for reliable and low power GPUs. For example, an embedded system using the ATI Radeon HD 3650 GPU draws very little power but delivers performance levels of hundreds of GFLOPS. The next-generation mobile GPUs are expected to nearly double this performance with a similar power envelope.

With such rapid development of GPU/CPUs, experiments have been carried out on GPU cards such as NVIDIA 9500GT and ATI Radeon HD 2400 PRO. Specifically, the execution time of computing Alder32 and Rabin fingerprint values of large data blocks in parallel were measured on multi-core GPUs and it was observed that a straightforward program implementation takes 60 to 90 microseconds to compute hash values of all chunks of 128 B in an entire data block of size 4 KB to 32 KB. This promising computing speed makes it possible to do on-the-fly computation for disk I/O operations.

Researchers in computer systems have long observed the strong regularity and content locality that exist in memory pages. Memory pages contain data structures, numbers, pointers, and programs that process data in a predefined way. Such strong regularity and content-locality have been successfully exploited for in-memory data compression. Large files and collections of files also show strong content locality with large amounts of data redundancy that can be eliminated by efficient compression algorithms. Delta encoding has been successfully used to eliminate redundancy of one object relative to another, suggesting that many data blocks can be represented as small patches/deltas with respect to reference blocks. Furthermore, recent research has shown strong content locality in many data-intensive applications, with only 5% to 20% of bits inside a data block being actually changed on a typical block write operation.

Besides the strong regularity and content locality inherent in block data, the most popular computing platform, virtual machines, provides us with additional opportunities for content locality. The emergence of cloud computing requires hundreds, even thousands of virtual machines running on servers and clients. Such widespread use of virtual machines creates a problem of virtual machine image sprawl where each virtual machine needs to store the entire stack of software and data as a disk image. These disk images contain a large amount of redundant data. Gupta et al. have recently presented a powerful Difference Engine that has successfully exploited such content locality to perform memory page compression with substantial performance gains. This strong content locality suggests again the possibility of organizing data differently in data storage to obtain optimal performance.

SUMMARY

In view of the existing technologies, the embodiments of the invention described and claimed below present a new data storage architecture for high performance, extended operating life for solid state memory elements, low power consumption, improved reliability, and reduced cost. The new architecture exploits the two emerging semi-conductor technologies. In preferred embodiments of the invention each storage element includes three major components: an SSD, an HDD and an intelligent processing unit. The SSD stores seldom changed and mostly read data called reference blocks and the HDD stores deltas (or patches) of data blocks of active I/Os with respect to reference data blocks stored in the SSD. The SSD and HDD are coupled by a high speed GPU/CPU/MCU that performs similarity detection, delta derivations upon I/O writes, combination of deltas with reference blocks in response to I/O reads, and other necessary functions for interfacing the storage to the host OS. Embodiments of the invention take advantage of three different technologies: 1) fast read performance of SSD, 2) supercomputing speed of GPU/CPU, and 3) reliable/durable/random write performance of HDD. Because of strong regularity and content locality that exist in data blocks, an HDD block can contain a large number of small deltas with respect to reference blocks. As a result, one HDD operation accomplishes multiple I/Os and hence embodiment of the invention improve disk I/O performance greatly by trading high speed computation of multi core GPUs for low access latency of HDDs. In addition, random writes in flash SSD are minimized giving rise to longer life time for SSD.

All of these features and advantages of the present invention, and more, are illustrated below in the drawings and detailed description that follow.

BRIEF DESCRIPTION OF THE DRAWINGS

For a fuller understanding of the nature and desired objects of the present invention, reference is made to the following detailed description taken in conjunction with accompanying drawing figures wherein like reference character denote corresponding parts throughout the several views and wherein.

DETAILED DESCRIPTION

Figure 1:
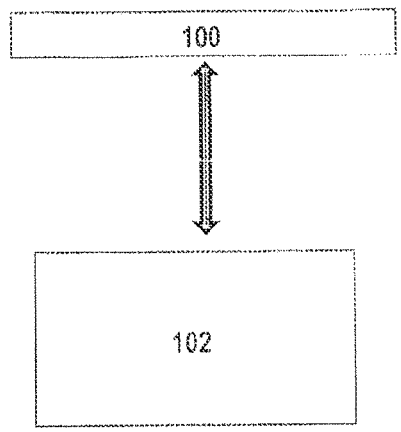
FIG. 1 is a block diagram of a data storage system using an SSD memory.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

Embodiments of the invention described below may be more clearly understood with reference to the following definitions:

A host computer system shall be understood to mean any computer system that uses and accesses a data storage system for data read and data write operations. Such host system may run applications such as databases, file systems, web services, and so forth.

SSD shall be understood as any solid state disks such as NAND gate flash memory, NOR gate flash memory, or any nonvolatile solid state memories having the properties of fast reads, slow writes, and limited life time due to wearing caused by write operations.

HDD shall be understood to mean any random access storage having the properties of high speed read performance, high speed write performance, and long life time not restricted to number of write operations performed, such HDDs include but not limited to hard disk drive, nonvolatile RAM (NVRAM), MEMS storage, and battery-backed DRAM. Although the descriptions in this invention concentrate on hard disk drives with spinning disks, NVRAM can be used in place of hard disk drive to store small deltas for high I/O performance and has no wearing effects upon write operations.

Memory element shall be understood to include both SSDs and HDDs.

Intelligent processing unit shall be understood to mean any computation engine capable of high performance computation and data processing, including but not limited to GPU (for graphic processing unit), CPU (for central processing unit), MCU (for micro controller unit). The term intelligent processing unit and GPU/CPU are used interchangeably in this document.

HBA shall mean any host bus adaptor that connect a storage device to a host computer on a standard bus such as PCI, PCI-Express, PCI-X, InfiniBand, HyperTransport, and alike. Examples of such HBA include SCSI PCI-E card, SATA PCI-E card, Fibre Channel PCI-E card, etc.

LBA shall mean the logic block address that represents the logic location of a block in a storage system. Host computer uses this address to read or write a data block.

Figure 2:
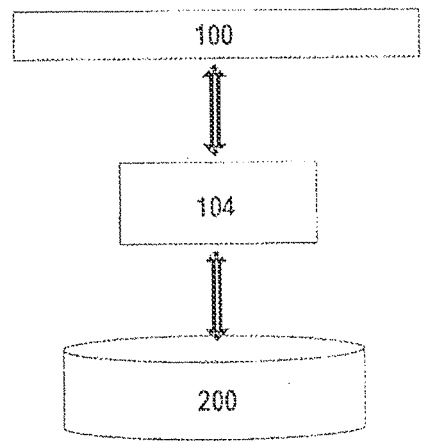
FIG. 2 is a block diagram of a hybrid data storage system using an SSD as a cache and an HDD for mass data storage.

FIG. 1 is a block diagram of a known data storage system consisting of a host computer 100 that reads data from and writes data to a NAND-gate flash, NOR-gate flash, or other known SSD memory chip 102. As described above, this simple system provides relatively poor I/O performance and short memory chip operating life. FIG. 2 is a block diagram of a similar known data storage system consisting of a host computer 100, an SSD 104 used as a lower level storage cache, and an HDD 200 for mass data storage. The use of the SSD 104 as a storage cache and the HDD 200 for mass storage provides only a small increase in performance in part because storage I/O requests have weak data locality and random writes shorten the operating life of an SSD.

Figure 3:
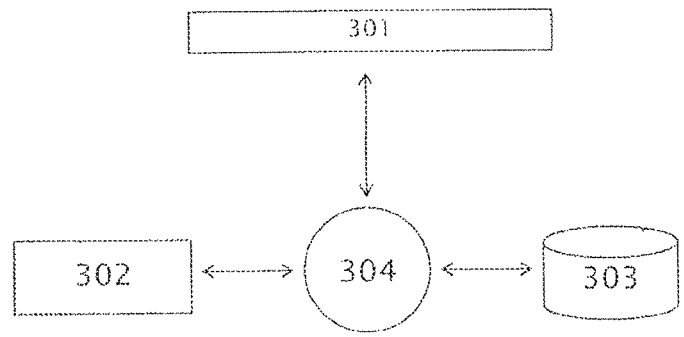
FIG. 3 is a block diagram of a hybrid data storage system using a GPU to control reads, writes, and erases to an SSD and an HDD.

As shown in FIG. 3, preferred embodiments of the invention provide significant performance improvements over the systems of FIGS. 1 and 2 by intelligently coupling an SSD 302 and an HDD 303 with a high performance GPU/CPU 304 incorporating a small DRAM buffer. A host computer 301 runs applications and accesses data stored in underline storage. The SSD 302 is any type of flash memory such as NAND-gate flash, NOR-gate flash, or any semiconductor storage with fast read speed, relatively low write speeds, and limited life time because of wearing caused by write operations. The SSD 302 stores mostly read data called reference blocks that are seldom written during online I/O operations.

The HDD 303 is any type of random access storage with same or similar speed for both reads and writes operations and has no significant wearing problems due to write operations. Such HDDs include but are not limited to spinning hard disk drives, NVRAM, battery backed DRAM, and MEMS storages. The HDD 303 stores deltas in delta blocks. A delta in a delta block is derived at run time and represents the difference between the data block of an active disk I/O operation and its corresponding reference block stored in the SSD 302. The intelligent processing unit 304 is any type of computing engine such as a GPU, CPU, or MCU that is capable of doing computations such as similarity detection, delta derivations upon I/O writes, combining delta with reference blocks upon I/O reads, data compression and decompressions, and other necessary functions for interfacing the storage to the host OS. Although the embodiment of FIG. 3 shows only one SSD and one HDD, it is to be understood that any embodiment of the invention may utilize more than one SSD and more than one HDD.

Figure 4:
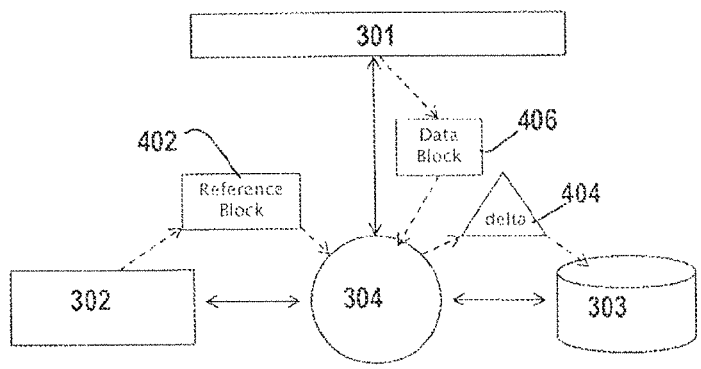
FIG. 4 is a block diagram of a write operation by the data storage system of FIG. 3.

Referring now to FIG. 4, in response to an I/O write by the host computer 301, the intelligent processing unit 304 identifies a reference block 402 in the SSD 302 and computes a delta 404 with respect to the reference block 402. The host computer 301 issues a write request to write a data block 406 in storage. The intelligent processing unit 304 processes the request and communicates with the SSD 302 and HDD 303 to serve the write operation. The intelligent processing unit 304 first identifies the reference block 402 stored in the SSD 302 that corresponds to the data block 406 and derives the delta 404 (difference) by comparing the reference block 402 with the data block 406 to be written. The derived delta 404 is stored in the HDD 303 together with other deltas previously derived from previous write operations as a group in a delta block unit.

Figure 5:
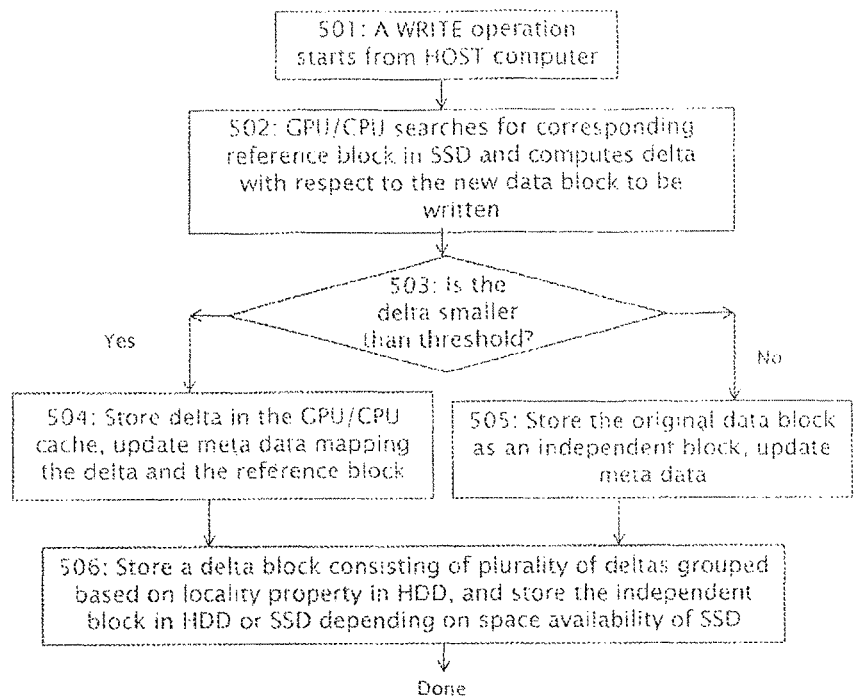
FIG. 5 is a high-level logic flowchart showing a write operation by the data storage system of FIG. 3.

Referring now to FIG. 5, which is a high-level logic flowchart showing a write operation by the data storage system of FIG. 3, a write operation is started by the host computer in step 501. In step 502 the intelligent processing unit searches for a corresponding reference block in the SSD and computes a delta with respect to the new data block to be written. In step 503 the intelligent processing unit determines whether the derived delta is smaller than a predetermined and configurable threshold value. If the derived delta is smaller than the threshold value (Yes), the newly derived delta is stored in the GPU/CPU cache and the meta data mapping the delta and the reference block are updated in step 504. The intelligent processing unit groups the new delta with previously derived deltas based on the access locality property. When there are enough deltas to fill out a basic data block unit, the delta block is stored in the HDD in step 506. If step 503 finds that the newly derived delta is larger than the threshold (No), the original data block is identified as an independent block 505, meta data is updated, and the independent block is stored unchanged 506 in the SSD if space permits or the HDD if space is not available on the SSD.

Figure 6:
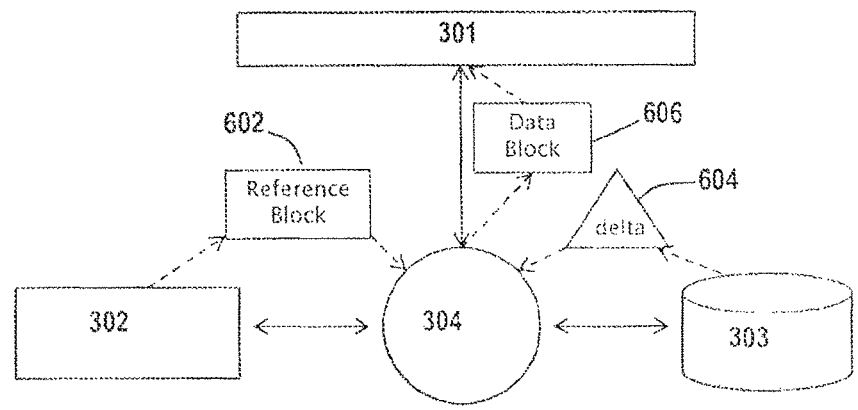
FIG. 6 is a block diagram of a read operation by the data storage system of FIG. 3.

Referring now to FIG. 6, in response to an I/O read by host computer 301 a data block 606 is returned by combining a delta 604 with its corresponding reference block 602 in the intelligent processing unit 304. The host computer 301 issues a read request to read a data block 606 from storage. The intelligent processing unit 304 processes the request and communicates with the SSD 302 and HDD 303 to serve the read operation. The intelligent processing unit 304 first determines whether the requested data block 606 has a corresponding reference block 602 stored in the SSD 302. If a corresponding reference block 602 is stored in the SSD 302 the intelligent processing unit 304 identifies the corresponding reference block 602 stored in the SSD 302 and reads the corresponding delta 606 from the RAM cache of the intelligent processing unit 304 if the delta 606 is present in the cache. If the delta 606 is not present in the cache, the intelligent processing unit 304 reads the delta from the HDD 303. The intelligent processing unit 304 then combines the reference block 602 with the delta 604 to obtain the requested data block 606. The combined data block 606 is then returned to the host computer system 301.

Figure 7:
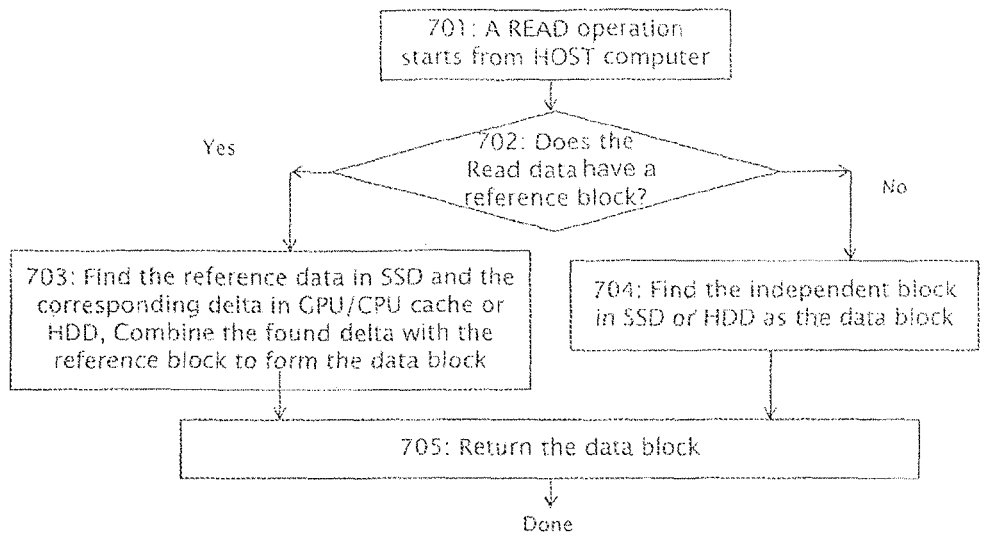
FIG. 7 is a high-level logic flowchart showing a read operation by the data storage system of FIG. 3.

Referring now to FIG. 7, which shows a high-level logic flowchart for read operations, a read operation is started by the host computer in step 701. At step 702, the intelligent processing unit (GPU/CPU) determines whether or not the requested data block has a reference block. If the data block has a reference block (yes), the intelligent processing unit searches for the corresponding reference block in the SSD and the corresponding delta block in the RAM cache of the intelligent processing unit. If no corresponding delta is present in the RAM cache of the intelligent processing unit, the intelligent processing unit searches for the corresponding delta on the HDD. Once both the reference block and the delta are found, the intelligent processing unit combines the reference block and the delta to form the requested data block in Step 703. If at step 702 the intelligent processing unit finds that the newly requested data block does not have a corresponding reference block ("No" after Step 702), the intelligent processing unit identifies at step 704 an independent block in the SSD, the CPU/GPU cache, or the HDD and returns at step 705 the independent data block to the host computer.

Since deltas are generally small due to data blocks' regularity and content locality, preferred embodiments of the invention store deltas in a compact form so that one HDD operation yields tens or even hundreds of IOs. The goal is to convert the majority of I/Os from the traditional seek-rotation-transfer I/O operations on HDD to I/O operations involving mainly SSD reads and high speed computations. The former takes tens of milliseconds whereas the latter takes tens of microseconds. As a result, the SSD in preferred embodiments of the invention is not another level of storage cache but an integral part of the architecture of preferred embodiments of the invention that takes full advantage of an SSD's fast read performance and avoids its poor erase/write performance. Because of 1) high speed read performance of reference blocks stored in SSDs, 2) potentially large number of small deltas packed in one delta block stored in HDD, and 3) high performance GPU/CPU coupling the two, preferred embodiments of the invention improve disk I/O performance greatly.

Figure 8:
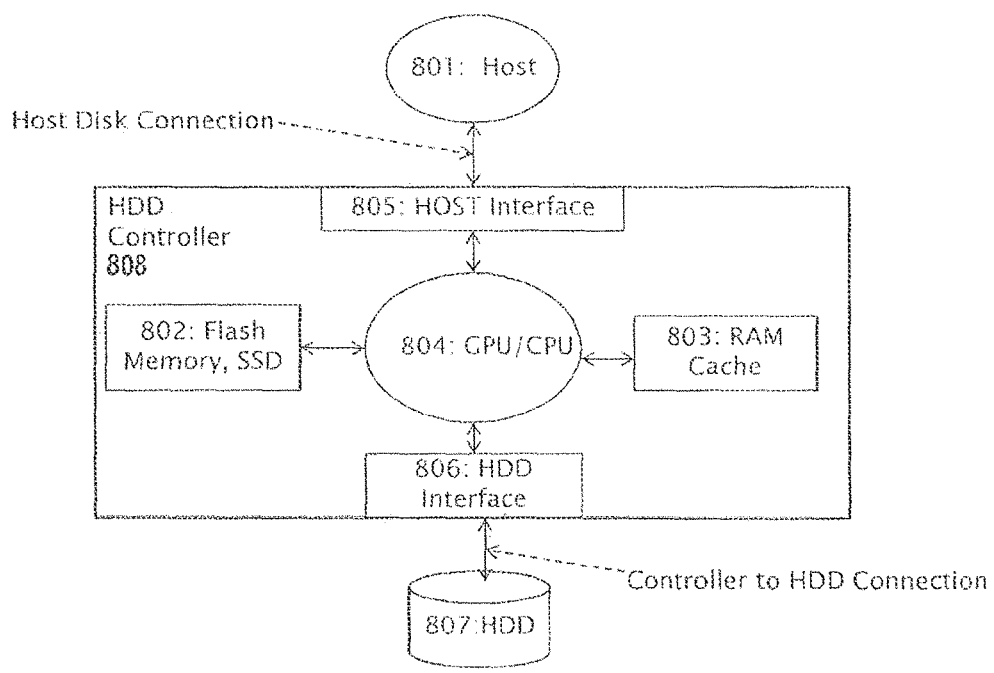
FIG. 8 is a block diagram of the data storage system of FIG. 3 implemented at the disk controller level.

In a first embodiment of the invention the invention's architecture is embedded inside a disk controller. The disk controller board has an added NAND-gate flash SSD or similar device, a GPU/CPU, and a small DRAM buffer in addition to the existing disk control hardware and interfaces to host bus adapter (HBA). FIG. 8 is a block diagram describing for implementation of the embodiment inside the HDD controller. A host system 801 is connected to a disk controller 808 using a standard interface 805. Such an interface can be SCSI, SATA, SAS, PATA, iSCSI, FC, or other known interfaces. The flash memory 802 is an SSD as defined to store reference blocks and similar data. The intelligent processing unit 804 performs logical operations such as delta derivation, similarity detection, combining delta with reference blocks, managing reference blocks, and managing meta data. The RAM cache 803 temporarily stores deltas for active I/O operations. The HDD controller 808 is connected to the HDD 807 by known means through the interface 806.

Figure 9:
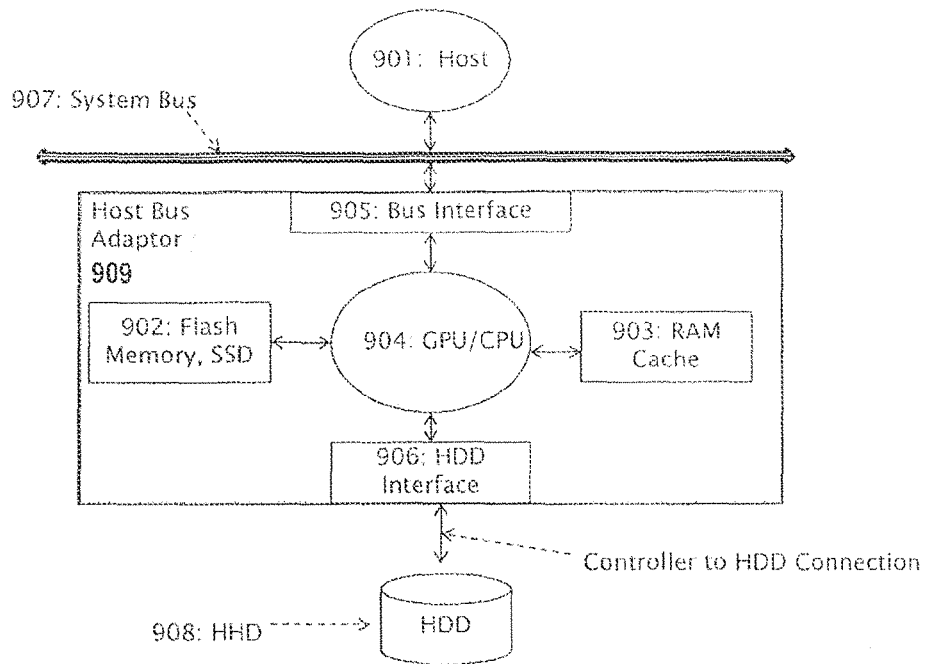
FIG. 9 is a block diagram of the data storage system of FIG. 3 implemented at the host bus adaptor level.

A second embodiment of the invention implements the invention at the host bus adaptor (HBA) level by adding the flash SSD, intelligent processing unit, and the DRAM buffer to an existing HBA such as SCSI, IDE, or SATA card. The new HBA will have a NAND-gate flash SSD or other know SSD, an intelligent processing unit, and a small DRAM buffer added to the existing HBA control logic and interfaces. FIG. 9 is a block diagram for implementation of the second embodiment inside the HBA 909. A host system 901 is connected to a system bus 907 that can be any known bus such as PCI, PCI-Express, PCI-X, HyperTransport, or InfiniBand. The bus interface 905 allows the HBA card to be connected to the system bus. The flash memory 902 is an SSD as defined to store reference blocks and other data. The intelligent processing unit 904 performs logical operations such as delta derivation, similarity detection, combining delta with reference blocks, managing reference blocks, and managing meta data. The RAM cache 903 temporarily stores deltas for active I/O operations. The HBA card 909 is connected to the HDD 908 through an HDD interface 906 using any known protocol such as SCSI, SATA, SAS, PATA, iSCSI, or FC.

Figure 10:
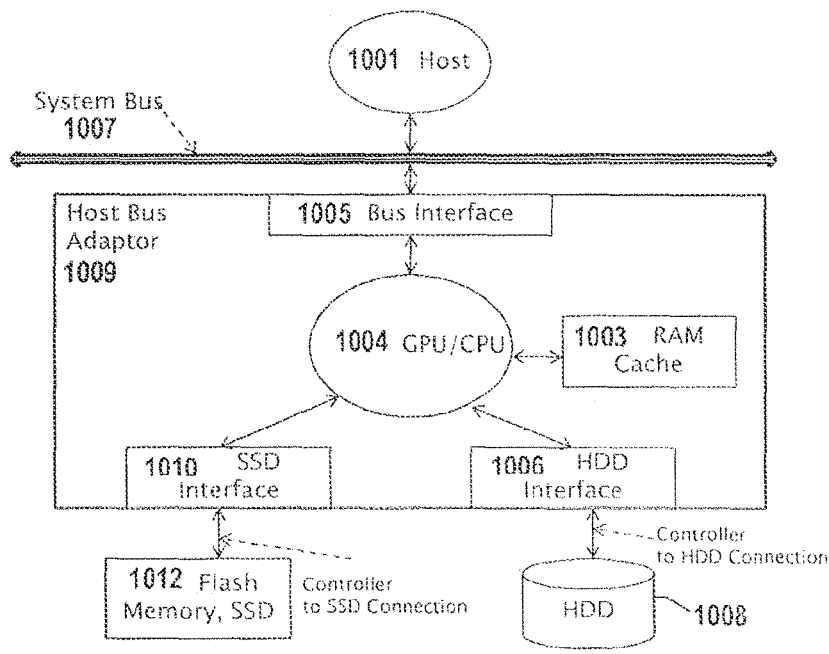
FIG. 10 is a block diagram of the data storage system of FIG. 3 implemented at the host bus adaptor level with external SSD.

A third embodiment of the invention implements the invention at the HBA level but includes no onboard flash memory. An external SSD drive such as SATA SSD, SCSI SSD, or other known SSD drive is used to store reference blocks. FIG. 10 is a block diagram describing this implementation. The HBA 1009 has a intelligent processing unit 1004 and a small DRAM buffer 1003 in addition to the existing HBA control logic and interfaces. The host system 1001 is connected to the system bus 1007 that can be any known bus such as PCI, PCI-Express, PCI-X, HyperTransport, or InfiniBand. The bus interface 1005 allows the HBA card 1009 to be connected to the system bus 1007. The intelligent processing unit 1004 performs logical operations such as delta derivation, similarity detection, combining delta with reference blocks, managing reference blocks, and managing meta data. The RAM cache 1003 temporarily stores deltas for active I/O operations. The external SSD 1012 is connected by an SSD interface 1010 to the HBA card 1009 for storage of reference blocks and other data. The SSD interface 1010 may use any known protocol such as SCSI, SATA, SAS, PATA, iSCSI, or FC.

Figure 11:
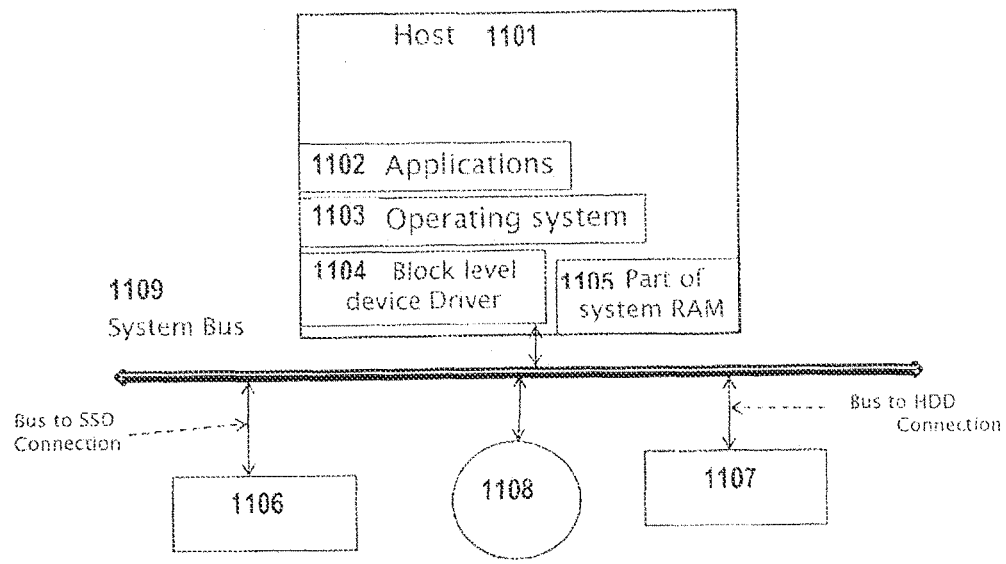
FIG. 11 is a block diagram of the data storage system of FIG. 3 implemented by software.

While the above implementations can provide great performance improvements, all require redesigns of hardware such as a disk controller or an HBA card. A fourth implementation of the invention relies on a software approach using commodity off-the-shelf hardware. A software application at the device driver level controls a separate SSD, GPU/CPU an embedded system card, and an HDD connected to the system bus. FIG. 11 is a block diagram describing a software implementation of the invention. This implementation assumes availability of standard off-the-shelf hardware such as an SSD 1106, an HDD 1107, and an embedded controller card 1108 such as GPU card. All these standard hardware components are connected to a standard system bus 1109. Such a standard system bus includes but is not limited to PCI, PCI-Express, PCI-X, HyperTransport, and InfiniBand. The fourth implementation of the invention is divided into two parts: one running on a host computer system 1101 and another running on an embedded system 1108. One possible partition is to have a device driver program 1104 at block level running on the host computer 1101 to perform meta data management and interfacing with upper layer software such as an operating system 1103 and an application 1102, while the remaining functions of the fourth embodiment are performed on the embedded system 1108. Functions should be scheduled between host 1101 and the embedded system 1108 in such a way that the loads of the embedded system 1108 and of the host system 1101 are balanced taking into account all work loads of the OS 1103, databases and applications 1102 etc running on the host 1101. Typically, the embedded system 1108 performs computation-intensive functions such as similarity detections, compression/decompression, and hashing functions. The embedded system 1108 can offload many functions from the host to reduce its computation burden. A part of the system RAM 1105 is used to temporarily cache deltas for efficient I/O operations and is invention's software module.

Figure 12:
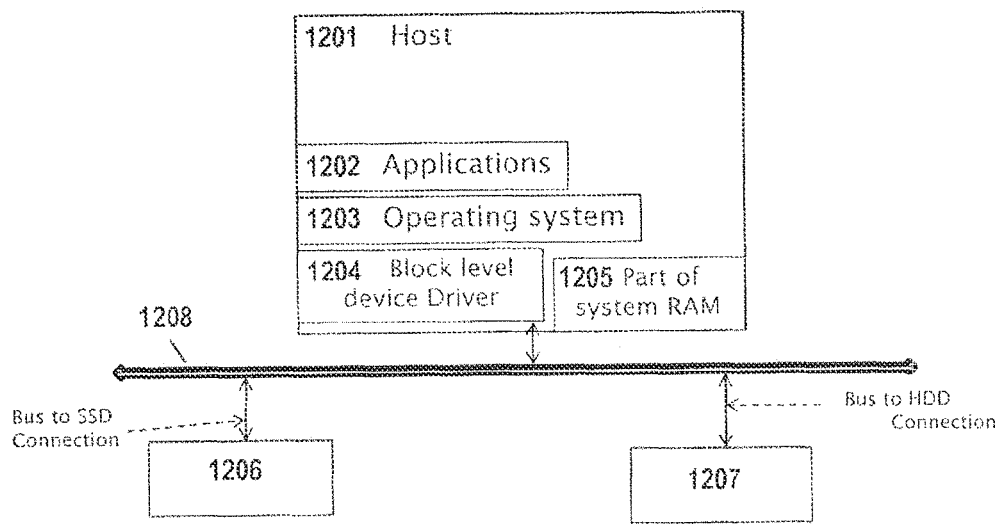
FIG. 12 is a block diagram of a hybrid data storage system using software on a host computer to control reads, writes, and erases to an SSD and an HDD.

A fifth embodiment for implementing the invention utilizes a software module running entirely on the host computer. This software solution assumes no additional hardware except for the SSD and HDD devices. The device driver uses a part of system RAM as the DRAM buffer. FIG. 12 describes this embodiment. A software module 1204 runs at the device driver level controlling an independent SSD 1206 and an independent HDD 1207 that are both connected to a system bus 1208. This implementation uses standard off-the-shelf hardware for the SSD 1206 and the HDD 1207. All these hardware components are connected to a system bus 1208. The system bus 1208 includes but is not limited to protocols such as PCI, PCI-Express, PCI-X, HyperTransport, and InfiniBand. The software implementing the fifth embodiment runs on the host computer system 1201. A software module 1204 operates and communicates directly with the SSD 1206 and the HDD 1207. The software module 1204 also controls part of the system RAM 1205 as a cache to temporarily buffer deltas for efficient I/O operations. The software module 1204 also interfaces and communicates with upper layer software modules such as the OS 1203 and applications 1202 etc running on the host 1201.

The fifth embodiment is easy to implement without requiring hardware changes but it consumes system resources such as the CPU, RAM, and the system bus. However, even when the fifth embodiment competes for system resources with normal application programs, the fifth embodiment shows great performance improvements over traditional systems. It is expected that hardware or well tuned solutions will have much greater performance improvement than is reported here. In addition, software implementation is OS dependent and requires different designs and implementations for different operating systems.

I/O scheduling for embodiments of the invention is quite different from that of traditional disk storage. For example, the traditional elevator scheduling algorithm for HDD aims at combining disk I/Os in an order that minimizes seek distances on the HDD. When embodiments of the invention are implemented such scheduling should be changed to combine I/Os that are likely to be connected to a reference block in SSD or addressed to deltas compacted in one delta block as opposed to minimizing seek distances. To do this, efficient meta-data structure is needed to relate LBAs of read I/Os to deltas stored in one delta block and to relate LBAs of write I/Os to reference blocks stored in SSD.

To serve I/O requests from the host, preferred embodiments of the invention use a sliding window mechanism similar to the one used in the TCP/IP protocol. Write I/O requests inside the window are candidates for delta compression with respect to reference blocks in SSD and are packed into one delta block to be stored in HDD. Read I/O requests inside the window are examined to determine all those that were packed in one delta block on HDD. The window slides forward as I/O requests are being served. Besides determining the best window size while considering both reliability and performance, one issue critical to the success of preferred embodiments of the invention is whether or not an embodiment is able to pack and unpack a batch of I/Os that are issued by the host in a short time frame so that one HDD operation generates many deltas that can be combined with reference blocks in SSD to satisfy the host's I/O requests.

Let $LBA_i$, $LBA_{i+1}$ ... $LBA_j$, ($j > i$) be a set of addresses of a sequence of write I/Os from the host in a predefined window. Suppose deltas of these I/Os are derived with respect to their corresponding reference blocks in an SSD and are packed in a delta block stored in an HDD. When an 10 request with one of the addresses in the above window $LBA_k$ ($i <= k <= j$) appears in subsequent IOs, can embodiments of the invention find a set of 10 requests immediately following $LBA_k$ with address $LB A_h$ ($i <= h <= j$)? If so, how many such I/Os can be found and what is the time frame length containing these I/Os? The number of $LBA_h$'s appeared in the time frame implies potential number of I/Os served by one HDD access. For a given number of such $LBA_h$'s, the length of the time frame containing them determines how long these data blocks need to stay in the DRAM buffer of an embodiment's controller. Therefore, these parameters are very important in the design of an embodiment's architecture. The following four examples show how such I/O patterns exist in real applications.

The first case is that all I/O operations that can take advantage of parallel disk arrays can take advantages of at least one embodiment of the invention. RAID was designed to boost I/O performance through parallelism in addition to fault tolerance. To achieve high throughput in RAID system, disk I/Os form data stripes across parallel disks with each disk storing one chunk of data in a stripe. When an embodiment of the invention is implemented, subsequent changes to these data chunks in a stripe can be compressed using the original data of the stripe as reference blocks stored in SSD. The deltas representing such changes on the stripe can be packed together in one delta block. For example, embodiments of the invention can pack deltas of all sequential I/Os into one delta block. Upon read operations of these sequential data blocks, one HDD operation serves all the I/O requests in the sequence. After the HDD operation that is the most time consuming part (in the order of milliseconds), what is left is only operations on semiconductors. The high speed intelligent processing unit takes only a few to tens of microseconds to combine the deltas with their corresponding reference blocks that are read from the SSD to satisfy these I/Os.

The second case is the widespread use of virtual machines that have become pervasive in today's cloud computing. As virtual machines are being created, disk images for the virtual machines are made to store software stack and data. The difference between data blocks of a virtual machine image and the data blocks of the native machine are very small and therefore it makes sense to store only the difference/delta between the two instead of storing the entire image. The pairing between a delta and its reference block is clear and should be the data block of the native machine and its exact image of the virtual machine. At the time when virtual machines are created, an embodiment of the invention compares each data block of a virtual machine image with the corresponding block of the native machine, derives deltas representing the differences of the image blocks from the native machine blocks, and packs the deltas into delta blocks to be stored in HDD. Future I/Os are served by combining deltas with their corresponding reference blocks in SSD, which mainly involves SSD reads and GPU computations with minimal HDD operations.

The third case involves the temporal locality and partial determinism behavior of general non-sequential I/Os. Prior experiments have shown that strong temporal locality exists in disk I/Os and besides sequential accesses to a portion of files, fragments of block access sequence repeat frequently. In many applications such as office, developer workstations, version control servers, and web servers, there are a large number of read I/Os that occur repeatedly and only 4.5-22.3% of the file system data were accessed over a week. Such repetitive and deterministic behavior can be exploited to take full advantages of the architecture of embodiments of the invention.

To observe the temporal locality of real applications, an experiment has been carried out by replaying SPC-1 I/O trace. SPC-1 trace represents a typical financial industry workload that was collected from an OLTP application running at one financial institution. In the experiment, a group of five consecutive write IOs are randomly picked up to pack them in one delta block. The experiment attempts to determine whether future IOs will repeat accessing these five blocks of data. Once a group of five consecutive write IOs is chosen, the rest of the trace after the five write I/Os is searched to find repetitions of the LBAs accessed by the five writes. The window size is set to one second, meaning that at every one second window, the number of LBAs appeared in that window is counted: 3, 4 or 5. The first column of Table 1, labeled as "Packing 5 consecutive write I/Os," shows the average number of repeats over 18 such random experiments. That is, 18 different groups of five consecutive write IOs are randomly selected to do the same experiments: counting the number of repeats, as a sample to derive the average. It is observed, on average, 4.6 repeats of 5 I/O requests addressing data with LBAs falling into the five packed write IOs. In other words, if the five write I/Os are packed in one delta block, these five data blocks will be repeatedly accessed in 1 second frame 4.6 times. If 3 of the 5 LBAs appeared in 1 second windows, there are 21 such repeats on average. Similar experiments were done using 10 consecutive write I/Os as shown in the second column of Table 1 labeled as "Packing 10 consecutive write IOs". As can be seen from the table, 8 of 10 LBAs in the 10 consecutive write IOs repeated for more than 5 times in the trace.

TABLE 1

Average number of useful deltas in one HDD block and their reuse frequency.

| | Packing 5 Consecutive write IOs | | | Packing 10 Consecutive write IOs | | | |
|---|---|---|---|---|---|---|---|
| # useful deltas | 3 | 4 | 5 | 6 | 7 | 8 | 9 | 10 |
| Ave # repeats | 21.1 | 6.2 | 4.6 | 7.6 | 5.5 | 5.1 | 0.5 | 0.3 |

It is important to note that the experiments chose consecutive write I/Os randomly from existing I/O traces with neither I/O scheduling nor selective packing. It is expected much better temporal locality behavior with more intelligent I/O scheduling algorithm, reference block identification, and pairing/packing algorithms.

In addition to the above experiment, another experiment was carried out on virtual machine creations. On a PC workstation with Dual-core Intel Xeon 5100 and 2 GB DRAM, 4 virtual machines were created using KVM and address traces were collected of the native machine and the 4 virtual machines while running TPC-C benchmarks. The address traces of the native machine are partitioned into 4 equal parts after dropping the beginning ⅕ of the traces to filter out the start up effect. These 4 equal parts are considered as 4 samples. In each of these 4 samples, the first 5 consecutive I/Os were picked up and also their respective LBAs, say LBA0 through LBA4. Using these 5 LBAs, each of the 4 virtual machine traces was scanned to look for the appearance of an LBAh such that ($0 \leq h \leq 4$). As soon as, such an LB Ah appears in the virtual machine traces, the time stamp is recorded and the next 4 I/Os are examined to see if they belong to one of LB AO through LBA4. If the immediate next I/O has address LBAI ($0 \leq I \leq 4$), 2 consecutive IOs have been found. If all the 4 I/Os immediately following LBAh belong to LBA0 through LBA4, then 5 consecutive I/Os have been found. In the experiments, all the time stamps of I/Os were recorded to look for 1, 2, 3, 4, or 5 consecutive I/Os after LBAh, with addresses belonging to LB AO through LBA4. It is observed that the timestamps of 1 through 5 subsequent I/Os are all within microsecond range indicating that once an LBAh is seen, 5 consecutive I/Os were immediately found with addresses belonging to LBA0 through LBA4. Among the 4 samples over 4 virtual machines, only VM2 and VM3 did not have 4 or 5 consecutive I/Os that repeat the LBAs of the very beginning 5 I/Os of sample 2. In these two cases, it is found that a single repeated I/O happens much earlier than 2 and 3 consecutive I/Os containing the 5 LBAs. In all other cases, 5 consecutive I/Os were found as soon as one I/O with LBAh is seen, indicating strong temporal locality supporting the architecture of embodiments of the invention.

Identifying a reference block in SSD for each I/O is a critical function of embodiments of the invention. For a write I/O, the corresponding reference block, if present, needs to be identified for delta compression. If the write I/O is a new write with no prior reference block, a new reference block must be identified that has the most similarity to the data block of the write I/O. For a read IO, as soon as the delta corresponding to the read IO is loaded, its reference block must be found to decompress to the original data block.

Clearly, it is essential to the overall I/O performance to quickly identify reference blocks. In order to identify reference blocks quickly, reference blocks are classified into three different categories. The first category contains all reference blocks that have exactly the same LBAs as deltas. These are the data blocks originally stored in the SSD but changes occur on these blocks during online operations such as database transactions or file changes. These changes are stored as deltas in HDD to avoid random writes to SSD.

Because of content locality, the deltas are expected to be very small. Identifying this type of block is straightforward with proper meta-data mapping deltas to reference blocks.

The second category contains data blocks generated as results of virtual machine creations. These blocks include copies of guest OS, guest application software, and user data that are largely duplicates with very small differences. Virtual machine cloning enables fast deployment of hundreds of virtual machines in a short time. Different virtual machines access their own virtual disk using virtual disk addresses while the host operating system manages the physical disk using physical disk address. For example, two virtual machines send two read requests to virtual disk addresses V1_LBAO and V2_LBA0, respectively. These two read requests are interpreted by underlying virtual machine monitor to physical disk addresses LBAx and LBAy, respectively, which are considered as two independent requests by traditional storage cache. Embodiments of the invention relate and associate these virtual and physical disk addresses by retrieving virtual machine related information from each I/O request. The requests with the same virtual address are considered to have high possibility to be similar and will be combined if they passed the similarity detection. For example, in this case, block V1_LBA0 (LBAx) is set as the reference block, embodiments of the invention will derive and keep the difference between V2_LBA0 (LBAy) and V1_LBA0 (LBAx) as delta.

The third category consists of data blocks that are newly generated with LBAs that do not match any one of the reference blocks stored in SSD. These blocks are created by file changes, file size increases, file creations, new tables, and so forth. While these new blocks may contain substantial redundant information compared to some reference blocks stored in SSD, finding the corresponding reference blocks that have most similarity on-the-fly very quickly is very important. A new similarity detection algorithm has been developed based on wavelet transform using multi-core GPU/CPU. While hashing has been widely used to find identical blocks, the sub-signatures that represent the combination of several hash values of sub-blocks is more appropriate for detecting similarity between two data blocks. The following paragraph describes briefly the similarity detection algorithm that is tailored to the multi core architecture.

The similarity of two blocks is defined as the number of same sub-signatures that the two blocks share. This is obvious since two blocks are similar in content if they share many same sub-signatures. However, such content similarity can be in-position match or out-of-position match caused by content shifting (e.g. inserting a word at the beginning of a block shifts all remaining bytes down by the word). To efficiently handle both in-position matches and out-of-position matches, embodiments of the invention use the combination of regular hash computations and the wavelet transform. Hash values for every three consecutive bytes of a block are computed to produce one byte signature in parallel. Haar wavelet transform is also computed in parallel. The six most frequent sub-signatures appeared in the block are then selected and three coefficients of the wavelet transform are selected for signature matching. That is, nine sub-signatures representing a block are compared: six sub-signatures and three coefficients of the wavelet transform. The three coefficients of the wavelet transform include one total average, and the positions of two largest amplitudes. The sub-signature of the total average value is used to pick up the best reference if multiple matches are found for the other eight signatures. Consider an example of a 4 KB block. Embodiments of the invention first calculate the hash values of all three consecutive bytes to obtain 4K-2 sub-signatures. Among these sub-signatures, the six most frequent sub-signatures are selected together with the three coefficients of the wavelet transform to carry out the similarity detection. If the number of matches exceeds seven, the reference block is found. Based on experimental observations, this sub-signature with position mechanism can recognize not only shifting of content but also shuffling of contents.

Figure 13:
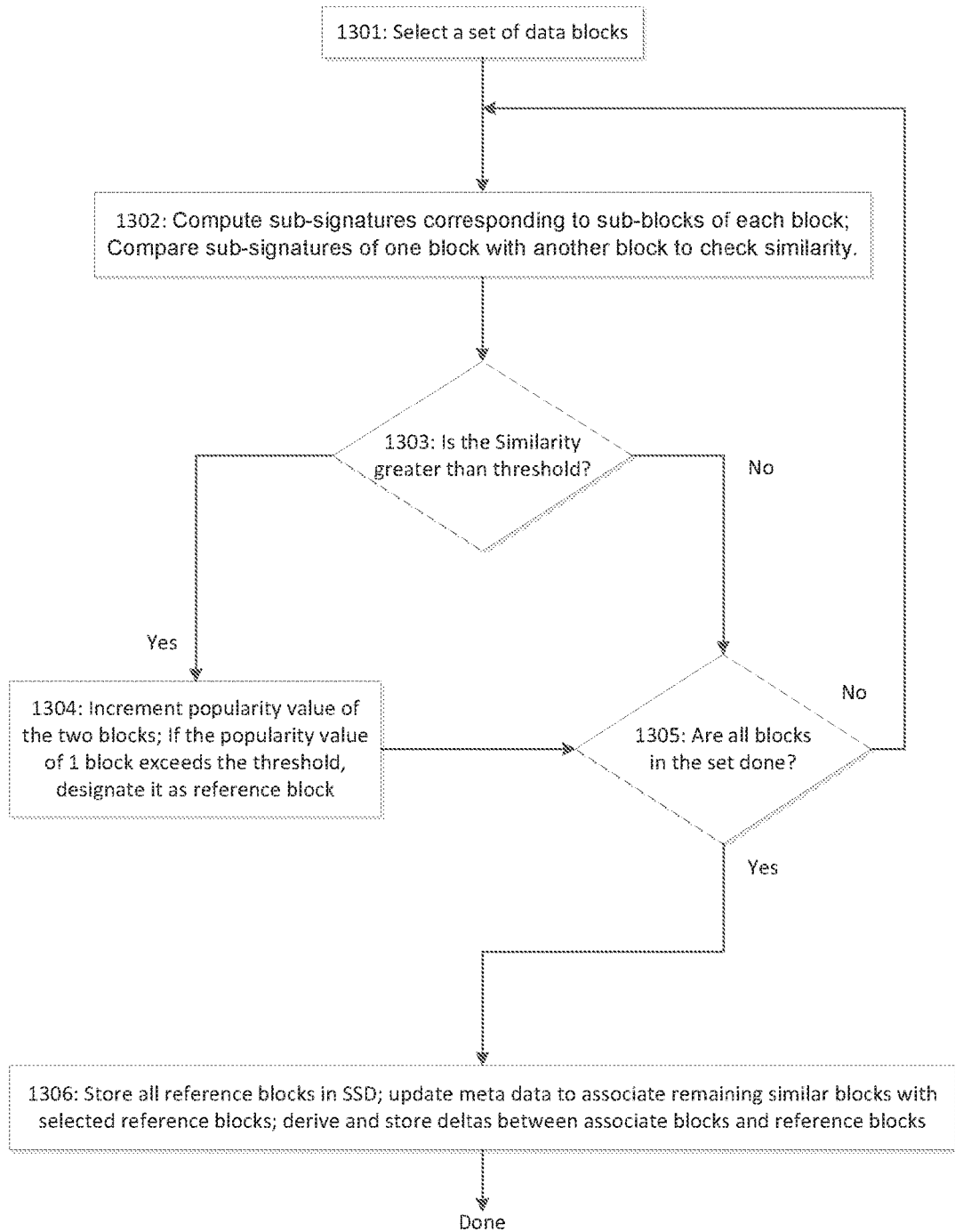
FIG. 13 is a high-level logic flowchart showing a process of block similarity detection and reference block determination.

FIG. 13 shows a high level flowchart for similarity detection that is invoked periodically or upon a new access to an independent data block. For periodical similarity detection, the period length and the set of blocks to be examined can be configured based on performance requirements and the sizes of SSD and HDD. For similarity detection upon a new access to an independent data block, a set of reference blocks in SSD can selected based empirical observations as described above. After selection of a set of blocks at step 1301 to examine for similarity detections, sub-signatures of sub-blocks of a block are computed at step 1302. One example of such sub-signature computation and selection is described in the above paragraph. A pair of data blocks is then compared to determine their similarity that was defined in the above paragraph. If the similarity of the two blocks exceeds a predefined and configurable threshold value checked in step 1303, the popularity value of the two blocks are incremented. If the popularity value of one of the two blocks exceeds the predefined and configurable threshold value, the data block will be designated as reference block to be stored in the SSD. The process continues to compare other blocks in the set through step 1305. If step 1303 determined that the similarity value of the two blocks is less than the threshold value, the process continues to other blocks through step 1305. Finally, after all the data blocks in the set are compared, all reference blocks are stored in the SSD and the remaining blocks are designated as associate blocks at step 1306. Meta data mapping the associate blocks to reference blocks are updated. Deltas are also derived by computing the difference between an associate block with respect to its corresponding reference block. Deltas are then packed to form delta blocks and stored in the HDD.

Embodiments of the invention attempt to store in SSD reference blocks that do not change frequently and share similarities with as many other data blocks as possible. It is therefore important to decide what data to store in SSD and how often to update SSD. The initial design is to store the entire software stack including OS and application software as well as all active user data as the base data. This is quite feasible with today's large-volume and less expensive NAND flash memories coupled with the fact that only 4.5-22.3% of file system data are typically accessed over a week. Data blocks of the software stack and base data are reference blocks in SSD. Run time changes to these reference blocks are stored in compressed form in delta blocks in HDD. These changes include changes on file data, database tables, software changes, and virtual machine images. Such incremental changes can be very effectively compacted in delta blocks. As changes keep adding, incremental drift may get larger and larger. To maintain high efficiency in embodiments of the invention, data stored in the SSD need to be updated. Each update requires changes on SSD and HDD as well as associated metadata.

There is an important tradeoff here between performance and life time of the SSD. If each SSD block is updated on a daily basis, an MLC NAND gate flash memory SSD can last for 10,000 days, approximately 27 years. If each SSD block is updated on a weekly basis, the same SSD will last for almost 200 years (if only consider wearing caused by erase operations). The exact frequency of such updates depends on application and specific workloads. The decision on how frequently the SSD should be updated should be made based on the impact of SSD updates on runtime I/O performance.

The next design decision is the optimal block size of reference blocks and delta blocks. Large reference blocks reduce meta-data overhead and allow potentially more deltas to be covered by one reference block. However, if the reference block size is too large, it places a burden on the GPU for computation and caching. Similarly, large delta blocks allow more deltas to be packed in and potentially high I/O efficiency because one disk operation generates more I/Os (note that each delta in a delta block represents one I/O block). On the other hand, it is a challenge whether I/Os generated by the host can take full advantage of this large amount of deltas in one delta block as discussed previously.

Another trade-off is whether to allow deltas packed in one delta block to refer to single reference block or multiple reference blocks in SSD. Using one reference block to match all the deltas in one delta block allows compression/decompression of all deltas in the delta block to be done with one SSD read. On the other hand, it is preferable that the deltas compacted in one delta block belong to I/O blocks that are accessed by the host in a short time frame (temporal locality) so that one HDD operation can satisfy more I/Os that are in one batch. These I/O blocks in the batch may not necessarily be similar to exactly one reference block for compression purposes. As a result, multiple SSD reads may be necessary to decompress different deltas stored in one delta block. Fortunately, random read speed of SSD is so fast that it is affordable to carry out reference block reads online.

Some embodiments of the invention have a DRAM buffer that temporarily stores I/O data blocks including reference blocks and delta blocks that are accessed by host I/O requests. This DRAM may buffer four types of data blocks: compressed deltas of a delta block that was read from HDD, data blocks for read I/Os after decompression, reference blocks from SSD, and data blocks of write I/Os. There are several interesting trade-offs in managing this DRAM buffer. The first interesting tradeoff is whether the compressed deltas are cached for memory efficiency or cache decompressed data blocks to be ready for high performance read I/Os. If compressed deltas are cached, the DRAM can store a large number of deltas corresponding to many I/O blocks. However, upon each read I/O, on-the-fly computation is necessary to decompress the delta to its original block. If decompressed data blocks are cached, these blocks are readily available to read I/Os but the number of blocks that can be cached is smaller than caching deltas.

The second interesting tradeoff is the space allocation of the DRAM buffer to the four types of blocks. Caching large number of reference blocks can speed up the process of identifying a reference block, deriving deltas upon write I/Os, and decompressing a delta to its original data block. However, read speed of reference blocks in SSD is already very high and hence the benefit of caching such reference blocks is limited. Caching a large number of data blocks for write I/Os, on the other hand, helps with packing more deltas in one delta block but raise reliability issues. Static allocation of cache space to different types of data blocks is simple but may not be able to achieve optimal cache utilization. Dynamic allocation, on the other hand, may utilize the cache more effectively but incurs more overhead.

The third interesting tradeoff is fast write of deltas to HDD versus delayed writes for packing large number of deltas in one delta block. For reliability purposes, it is preferable to perform write to HDD as soon as possible whereas for performance purposes it is preferable to pack as many deltas in one block as possible.

The computation time of Rabin fingerprint hash values is measured for large data blocks on multi-core GPUs. This computation is important in identifying reference blocks in SSD. The times it takes to compute hash values of a data block with size of 4 KB to 32 KB are from 60 microseconds to 90 microseconds. In embodiments of the invention three of the most time-consuming processing parts have been implemented on the GPU. The first part is the signature generation that includes hashing calculations and the Haar wavelet transform. As described previously, every three consecutive bytes are hashed to get the distribution of sub-signatures. This operation can be parallelized by calculating all the hash values at the same time using 4K GPU threads. The 1D Haar wavelet is divided into 512-bytes sub-blocks each of which is processed by 512 threads to run decompositions ten times. Execution times of Haar transforms were measured using NVIDIA 9500GT GPU as compared to 1.8 GHz Xeon CPU for block size ranging from 1 KB to 256 KB. The execution time of the GPU ranges from 236 microseconds to 345 microseconds. The maximum speed up over the CPU reaches a factor of 26. The second part is the periodical Rmean computations to identify similarities among unrelated data blocks. Such similarity detection can be simplified as a problem of finding k centers in a set of points. The remaining points are partitioned into k clusters so that the total within-cluster sum of squares (WCSS) is minimized. Multiple GPU threads are able to calculate the WCSS for all possible partitioning solutions at same time. The results are synchronized at the end of the execution, and the optimum clustering is returned to an embodiment of the invention. Execution times on GPU and CPU are measured, respectively, to do Kmean computation for the number of points ranging from 2000 to 10,000. The GPU execution time ranges from 154 ms to 385 ms and the speed up of the GPU over the CPU goes as high as 121 times. The advantages of GPU become more evident as more points are included in the similarity detection process. In the current prototype implementation, Kmean computation was invoked periodically to identify reference blocks to be stored in the SSD. The third part is delta compression and decompression. Currently, the simple existing ZDelta compression algorithm is used for the prototype implementation. Further optimization of delta codec is possible with finely-tuned program designs.

In order to see whether embodiments of the invention are practically feasible and provide anticipated performance benefits, a proof-of-concept prototype was developed using open source Kernel Virtual Machine (KVM). The prototype represents only a partial realization of an embodiment of the invention, using a software module since a full scale hardware implementation of I-CASH is a huge engineering undertaking. The functions that the prototype has implemented include identifying reference blocks in a virtual machine environment and using Kmean similarity detections periodically, deriving deltas using Zdelta algorithm for write I/Os, serving read I/Os by combining deltas with reference blocks, and managing interactions between SSD and HDD. The current prototype carries out the necessary computations using the host CPU and uses a part of system RAM as the DRAM buffer of the I-CASH. Although GPU was not used for computation tasks needed by the embodiment of the invention in the prototype at this time, it is believed that the performance evaluation using this preliminary prototype presents a conservative result because 1) such computations take additional system resources such as CPU time and system RAM space and 2) the experiments show that GPU computes these necessary computations 26 to 121 times faster than CPU as discussed previously.

In order to be able to capture both block level I/O request information and virtual machine related information, the prototype module is implemented in the virtual machine monitor. The I/O function of the KVM depends on QEMU that is able to emulate many virtual devices including virtual disk drive. The QEMU driver in a guest virtual machine captures disk I/O requests and passes them to the KVM kernel module. The KVM kernel module then forwards the requests to QEMU application and returns the results to the virtual machine after the requests are complete. The I/O requests captured by the QEMU driver are block-level requests of the guest virtual machine. Each of these requests contains the virtual disk address and data length. The corresponding virtual machine information is maintained in the QEMU application part. The invention embodiment of the prototype is implemented at the QEMU application level and is therefore able to catch not only the virtual disk address and the length of an I/O request but also the information of which virtual machine generates this request. The most significant byte of the 64-bit virtual disk address is used as the identifier of the virtual machine so that the requests from different virtual machines can be managed in one queue. If two virtual machines are built based on the same OS and application, two I/O requests are candidates for similarity detection if the lower 56 bits of their addresses are identical.

The software module of the prototype's invention embodiment maintains a queue of disk blocks that can be one of three types: reference blocks, delta blocks, and independent blocks. It dynamically manages these three types of data blocks stored in the SSD and HDD. When a block is selected as a reference, its data is stored in the SSD and later changes to this block are redirected to the delta storage consisting of the DRAM buffer and the HDD. In the current implementation, the DRAM is part of the system RAM with size being 32 MB. An independent block has no reference and contains data that can be stored either in the SSD or in the delta storage. To make an invention embodiment work more effectively, a threshold is chosen for delta blocks such that delta derivation is not performed if the delta size exceeds the threshold value and hence the data is stored as independent block. The threshold length of delta determines the number of similar blocks that can be detected during similarity detection phase. Increasing the threshold will increase the number of detected similar blocks but will also result in large deltas limiting the number of deltas that can be compacted in a delta block. 768 bytes are used as the threshold for the delta length in the prototype based on experimental observations.

Similarity detection to identify reference blocks is done in two separate cases in the prototype implementation. The first case is when a block is first loaded into an invention embodiment's queue and the invention embodiment searches for the same virtual address among the existing blocks in the queue. The second case is periodical scanning after every 20,000 I/Os. At each scanning phase, the invention embodiment first builds a similarity matrix to describe the similarities between block pairs. The similarity matrix is processed by the Kmean algorithm to find a set of minimal deltas that are less than the threshold. One block of each such pair is selected as reference block. The association between newly found reference blocks and their respective delta blocks is reorganized at the end of each scanning phase.

An invention embodiment prototype may be installed on KVM of the Linux operating system running on a PC server that is a Dell PowerEdge T410 with 1.8 GHz Xeon CPU, 2 GB RAM, and 160 G SATA drive. This PC server acts as the primary server. An SSD drive (OCZ Z-Drive p84 PCI-Express 250 GB) is installed on the primary server. Another PC server, the secondary server, is Dell Precision 690 with 1.6 GHz Xeon CPU, 2 GB RAM, and 400 G Seagate SATA drive. The secondary server is used as the workload generator for some of the benchmarks. The two servers are interconnected using a gigabit Ethernet switch. The operating system on both the primary server and the secondary server is Ubuntu 8.10. Multiple virtual machines using the same OS are built to execute a variety of benchmarks.

For performance comparison purpose, a baseline system is also installed on the primary PC server. The main difference between the base line system and a system implementing an embodiment of the invention is the way the SSD and HDD are managed. In the baseline system, the SSD is used as an LRU disk cache on top of the HDD. In a system implementing an embodiment of the invention, on the other hand, the SSD stores reference data blocks and HDD stores deltas as described previously.

Appropriate workloads are important for performance evaluations. It should be noted that evaluating the performance of embodiments of the invention is unique in the sense that I/O address traces are not sufficient because deltas are content-dependent. That is, the workload should have data contents in addition to address traces. Because of this uniqueness, none of the available I/O traces is applicable to the performance evaluations. Therefore, seven standard I/O benchmarks that are available to the research community have been collected as shown in Table 2.

TABLE 2

Standard benchmarks used in performance evaluation of I-CASH

| Abbreviation | Name | Description |
|---|---|---|
| RU | RUBiS | e-Commerce web server workload |
| TP | TPC-C | Database server workload |
| SM | SPECmail2009 | Mail server workload |
| SB | SPECwebBank | Online banking |
| SE | SPECwebEcommerce | Online store selling computers |
| SS | SPECwebSupport | Vendor support website |
| SF | SPECsfs2008 | NFS file server |

The first benchmark, RUBiS, is a prototype that simulates an e-commerce server performing auction operations such as selling, browsing, and bidding similar to eBay. To run this benchmark, each virtual machine on the server has installed Apache, Mysql, PHP, and RUBiS client. The database is initialized using the sample database provided by RUBiS. Five virtual machines are generated to run RUBiS using the default settings of 240 clients and 15 minutes running time.

TPC-C is a benchmark modeling the operations of real-time transactions. It simulates the execution of a set of distributed and on-line transactions (OLTP) on a number of warehouses. These transactions perform the basic database operations such as inserts, deletes, updates and so on. Five virtual machines are created to run TPCC-UVA implementation on the Postgres database with 2 warehouses, 10 clients, and 60 minutes running time.

In addition to RUBiS and TPC-C, five data intensive SPEC benchmarks developed by the Standard Performance Evaluation Corporation (SPEC) have also been set up. SPECMail measures the ability of a system to act as an enterprise mail server using the Internet standard protocols SMTP and IMAP4. It uses folders and message MIME structures that include both traditional office documents and a variety of rich media contents for multiple users. Postfix was installed as the SMTP service, Dovecot as the IMAP service, and SPECmail2009 on 5 virtual machines. SPECmail2009 is configured to use 20 clients and 15 minutes running time. SPECweb2009 provides the capability of measuring both SSL and non-SSL request/response performance of a web server. Three different workloads are designed to better characterize the breadth of web server workload. The SPECwebBank is developed based on the real data collected from online banking web servers. In an experiment, one workload generator emulates the arrivals and activities of 20 clients to each virtual web server under test. Each virtual server is installed with Apache and PHP support. The secondary PC server works as a backend application and database server to communicate with each virtual server on the primary PC server. The SPECwebEcommerce simulates a web server that sells computer systems allowing end users to search, browse, customize, and purchase computer products. The SPECwebSupport simulates the workload of a vendor's support web site. Users are able to search for products, browse available products, filter a list of available downloads based upon certain criteria, and download files. Twenty clients are set up to test each virtual server for both SPECwebEcommerce and SPECwebSupport with each test duration being 15 minutes. The last SPEC benchmark, SPECsfs, is used to evaluate the performance of an NFS or CIFS file server. Typical file server workloads such as LOOKUP, READ, WRITE, CREATE, and REMOVEc are simulated. The benchmark results summarize the server's capability in terms of the number of operations that can be processed per second and the I/O response time. Five virtual machines are setup and each virtual NFS server exports a directory to 10 clients to be tested for 10 minutes.

Using the preliminary prototype and the experimental settings, a set of experiments have been carried out running the benchmarks to measure the I/O performance of embodiments of the invention as compared to a baseline system. The first experiment is to evaluate speedups of embodiments of the invention compared to the baseline system. For this purpose, all the benchmarks were executed on both an embodiment of the invention and on the baseline system.

Figure 14:
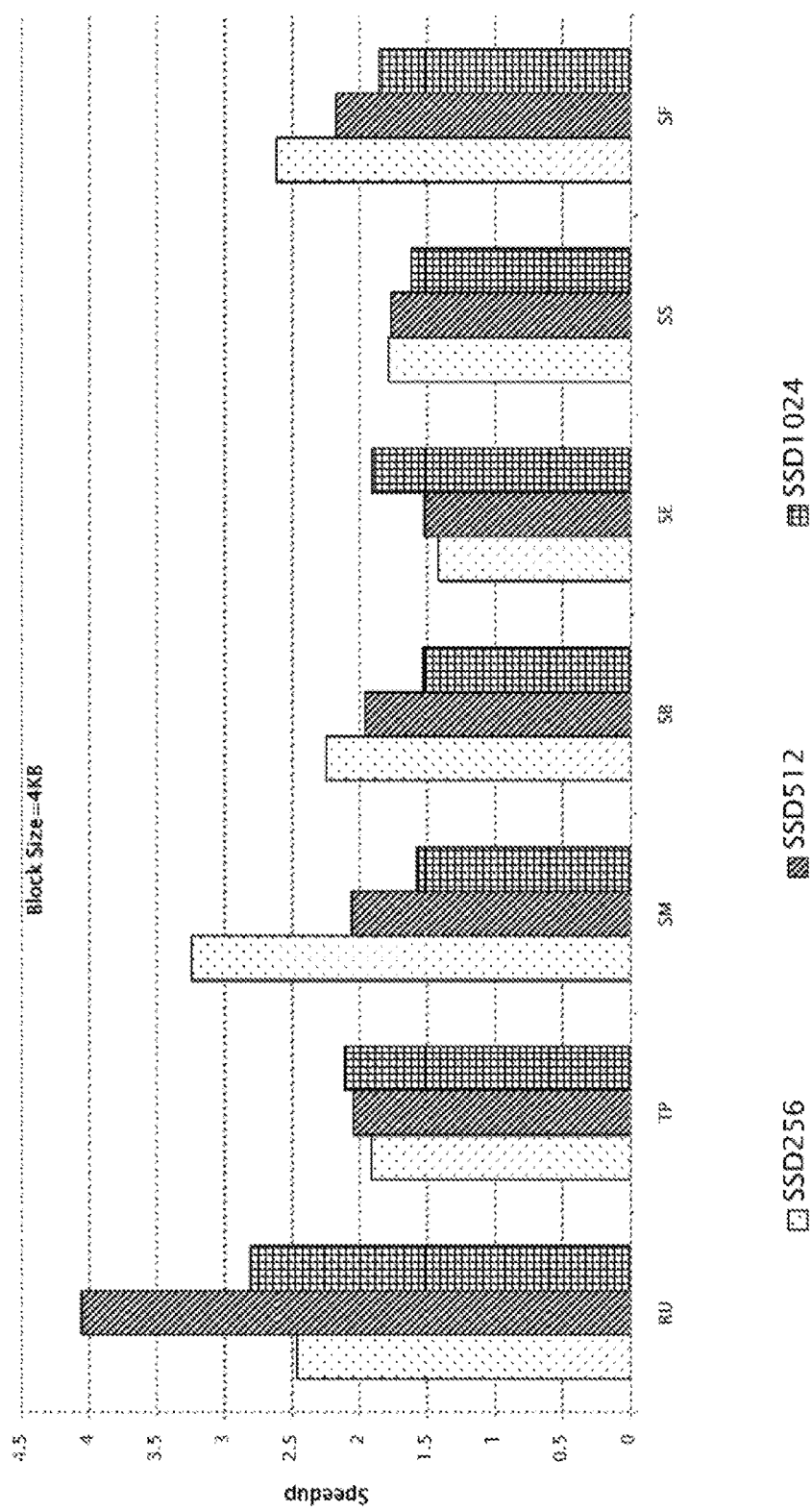
FIG. 14 is a bar graph showing I/O speedup factors achieved by the data storage system of FIG. 12 in comparison with a baseline system using an SSD as an LRU disk cache on top of an HDD, with both systems running identical sets of standard benchmarks and using a 4 KB block size.

FIG. 14 shows the measured speedups for all seven benchmarks. From this figure, it is observed that for 5 out of 8 benchmarks an embodiment of the invention improves the overall I/O performance of the baseline system by a factor of 2 or more with the highest speedup being a factor of 4. In the experiment, 3 different SSD sizes were considered: 256 MB, 512 MB, and 1 GB. It is interesting to observe from this figure that the speedup does not show monotone change with respect to SSD size. For some benchmarks large SSD gives better speedups while for others large SSD gives lower speedups. This variation indicates the strong dependence of the tested embodiment of the invention on the dynamics of workloads and data content as discussed above.

While I/O performance generally increases with the increase of SSD cache size for the baseline system, the performance change of the tested embodiment of the invention depends on many other factors in addition to SSD size. For example, even though there is a large SSD to hold more reference blocks, the actual performance of the tested embodiment of the invention may fluctuate slightly depending on whether or not the system is able to derive large amount of small deltas to pair with those reference blocks in the SSD, which is largely workload dependent. Nevertheless, the tested embodiment of the invention performs constantly better than the baseline system with performance improvement ranging from 50% to a factor of 4 as shown in FIG. 14.

The speedups shown in FIG. 14 are measured using 4 KB block size for reference blocks to be stored in the SSD. This block size is also the basic unit for delta derivations and delta packing to form delta blocks to be stored in the HDD. As discussed in the previous section, reference block size is a design parameter that affects delta computation and number of deltas packed in a delta block.

Figure 15:
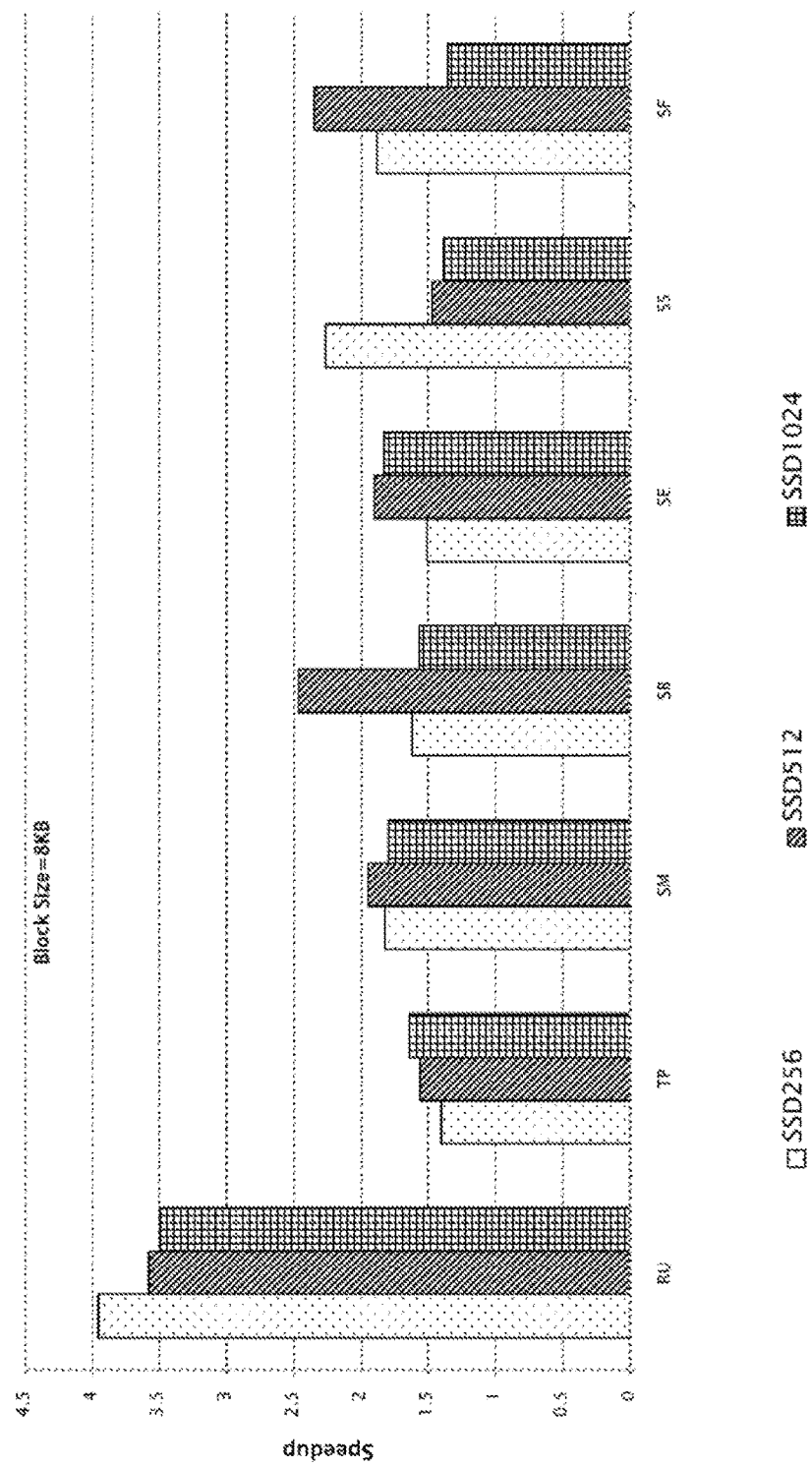
FIG. 15 is a bar graph showing I/O speedup factors achieved by the data storage system of FIG. 12 in comparison with a baseline system using an SSD as an LRU disk cache on top of an HDD, with both systems running identical sets of standard benchmarks and using an 8 KB block size.

FIG. 15 shows speedups measured using a similar experiment but with an 8 KB block size. Comparing FIG. 15 with FIG. 14, very small differences were noticed on overall speedup when an 8 KB block size is compared to a 4 KB block size. Intuitively, large block size should give better performance than small block size because of the large number of deltas that can be packed in a delta block stored in the HDD. On the other hand, large block size increases the computation cost for delta derivations. It is expected that the situation will change if a dedicated high speed GPU/CPU is used for such computations.

To isolate the effect of computation times, the total number of HDD operations of the tested embodiment of the invention and that of the baseline system were measured. The I/O reductions of the tested embodiment of the invention were then calculated as compared to the baseline by dividing the number of HDD operations of the baseline system by the number of HDD operations of the tested embodiment of the invention.

Figure 16:
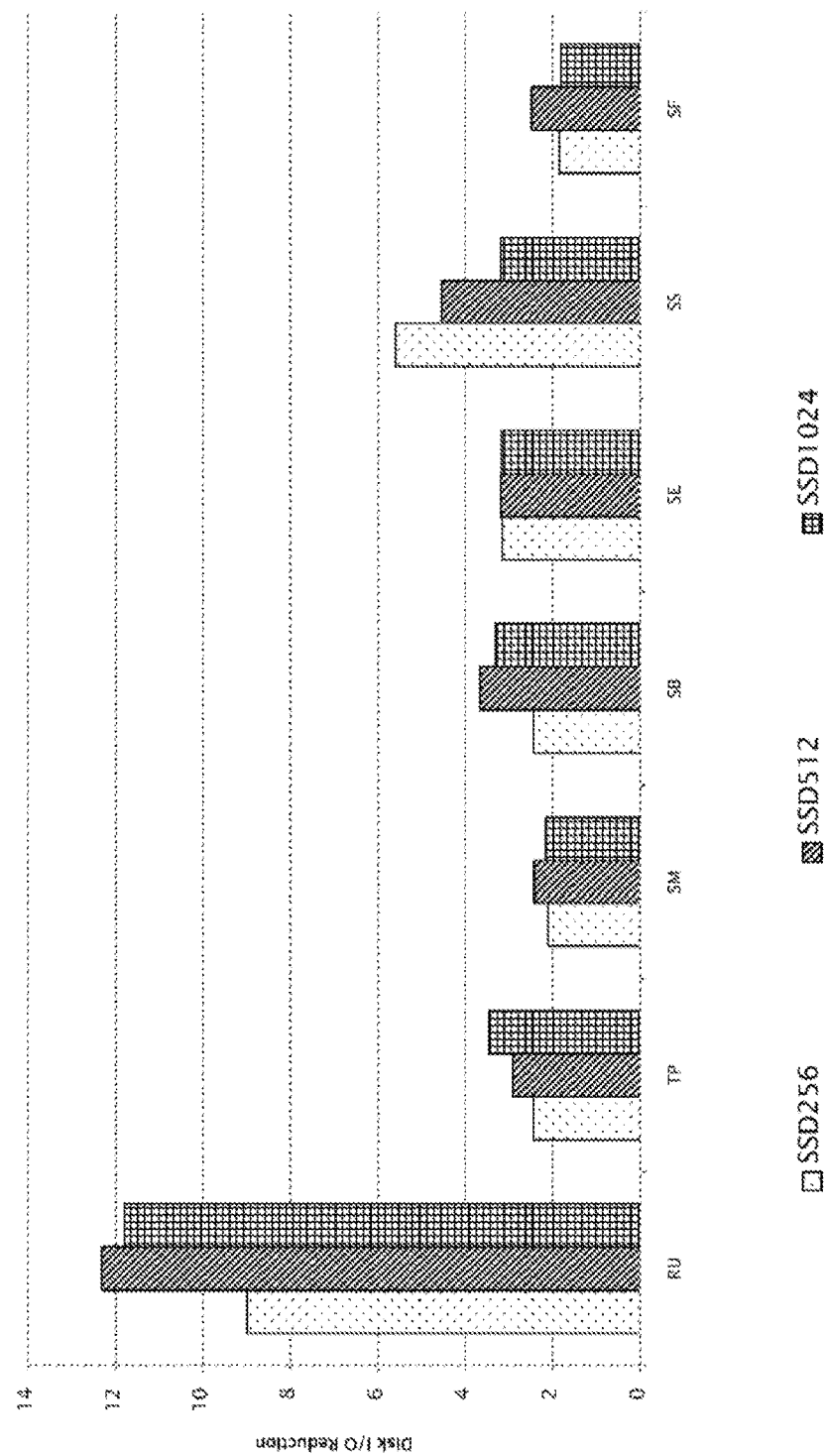
FIG. 16 is a bar graph showing HDD disk I/O reductions achieved by the data storage system of FIG. 12 in comparison with a baseline system using an SSD as an LRU disk cache on top of an HDD, with both systems running identical sets of standard benchmarks and using a 4 KB block size.
Figure 17:
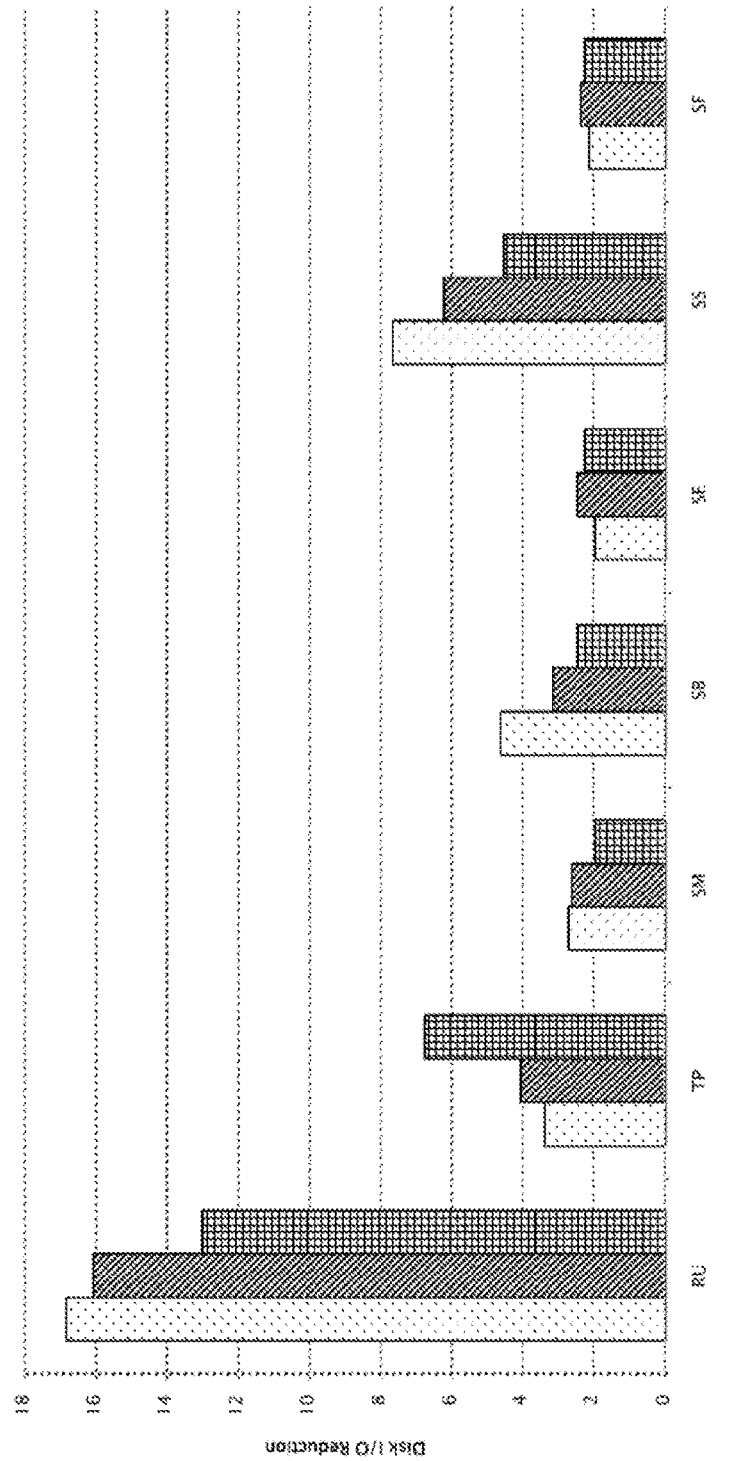
FIG. 17 is a bar graph showing HDD disk I/O reductions achieved by the data storage system of FIG. 12 in comparison with a baseline system using an SSD as an LRU disk cache on top of an HDD, with both systems running identical sets of standard benchmarks and using an 8 KB block size.

FIGS. 16 and 17 show the I/O reductions for all the benchmarks with block size being 4 KB and 8 KB, respectively. It is clear from these figures that the tested embodiment of the invention reduces the number of HDD operations to half at least for all benchmarks. This factor of 2 I/O reduction did not directly double performance in terms of overall I/O performance. This can be attributed to the computation overhead of the tested embodiment of the invention since the current prototype is implemented in software and consumes system resources for delta computations. This observation can be further evidenced by comparing FIG. 16 with FIG. 17 where the only difference is block size. With larger block size, the HDD disk I/O reduction is greater than smaller block size because more deltas are packed in one delta block stored in the HDD. However, the overall performance differences between these two block sizes, as shown in FIGS. 14 and 15, are not as noticeable as I/O reductions.

From FIGS. 14 through 17 it is noticed that RUBiS benchmark performs the best on the tested embodiment of the invention for all cases. To understand why this benchmark shows such superb performance, the I/O traces of the benchmarks were analyzed. Analyzing the I/O traces unveiled that RUBiS benchmark has 90% of blocks that are repeatedly accessed for at least 2 times and 70% of blocks that are accessed for at least 3 times. This highly repetitive access pattern is not found in other 6 benchmarks. For example, 40% of blocks are accessed only once in the SPECmail benchmark run. Because of time constraint, benchmark running time was limited in the experiments. It might have been that the repetitive access pattern will show after a sufficient long running time since it is observed such behavior in real world I/O traces such as SPC-1.

Figure 18:
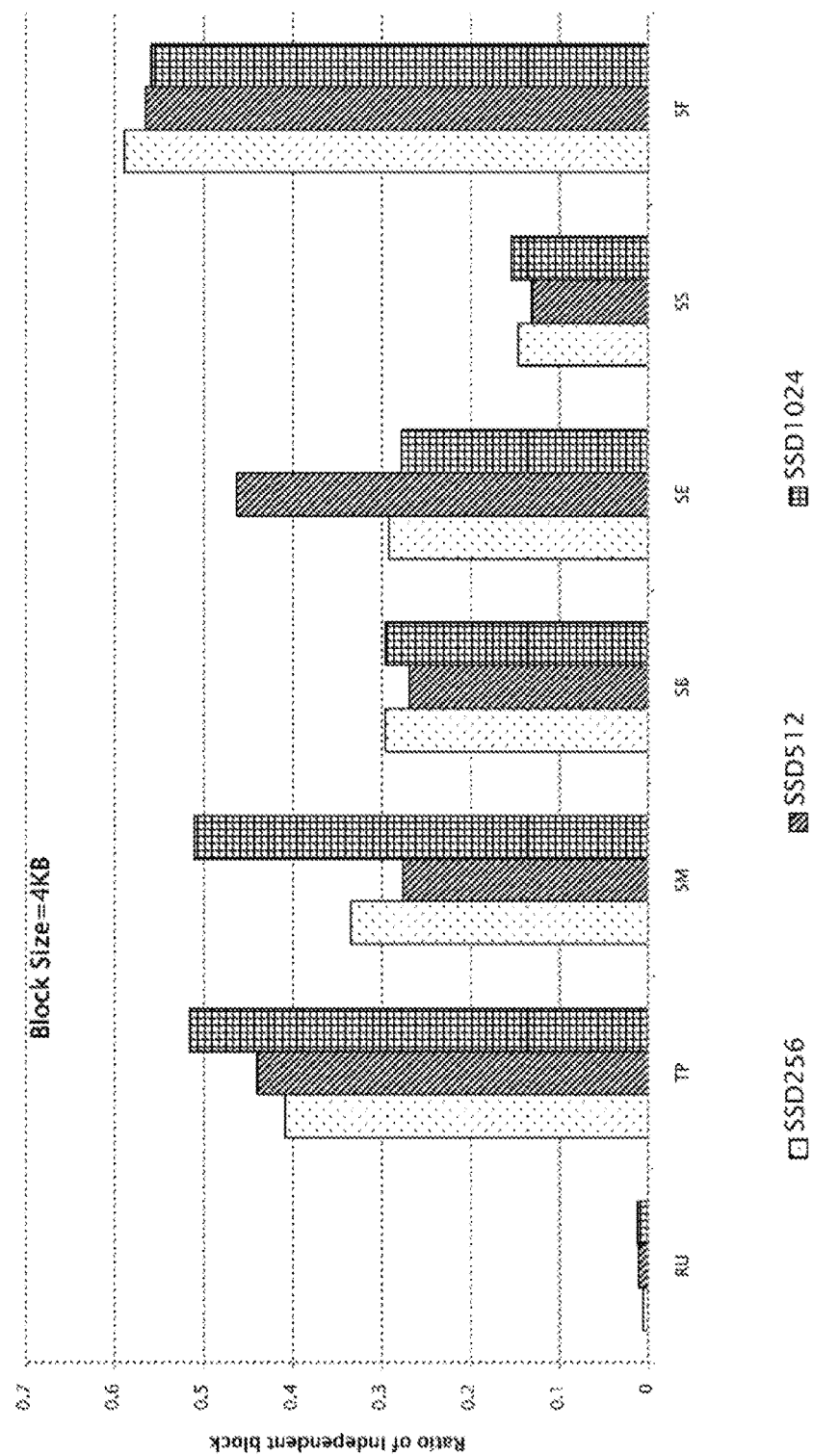
FIG. 18 is a bar graph showing estimated percentages of independent blocks stored by the system of FIG. 12 running a set of standard benchmarks and using a 4 KB block size.
Figure 19:
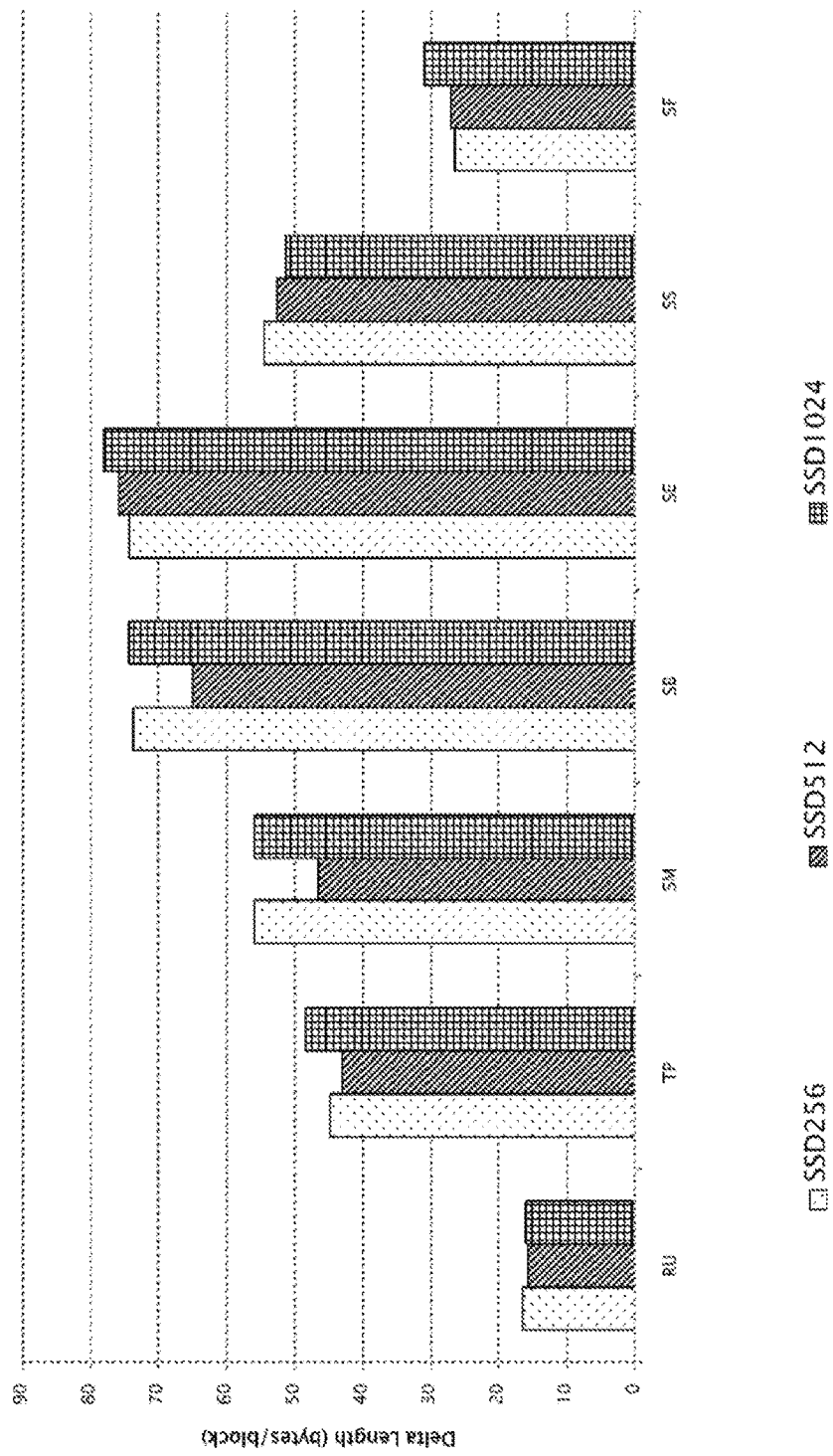
FIG. 19 is a bar graph showing average sizes of deltas stored by the system of FIG. 12 running a set of standard benchmarks and using a 4 KB block size.

Besides I/O access patterns that affect performance of the tested embodiment of the invention, another important factor impacting that performance is the percentage of I/O blocks that can find their reference blocks in SSD and can be compressed to small deltas with respect to their corresponding reference blocks. FIG. 18 shows the percentage of independent blocks found in the experiments. Recall that independent blocks are the I/O blocks that are stored in the traditional way because the tested embodiment of the invention cannot find related reference blocks to produce small enough delta less than the predefined threshold. From FIG. 18 it is observed that the tested embodiment of the invention is able to find over 50% of I/O blocks for delta compression except for SPECsfs. The average delta sizes of the delta compression are shown in FIG. 19 for all the benchmarks. Clearly, the smaller the delta, the better the tested embodiment of the invention performs. Consistent with the performance results shown in FIGS. 13 to 16, RUBiS benchmark has the largest percentage of blocks that can be compressed and the least delta size as shown in FIGS. 18 and 19. As a result, it shows the best I/O performance overall.

Figure 20:
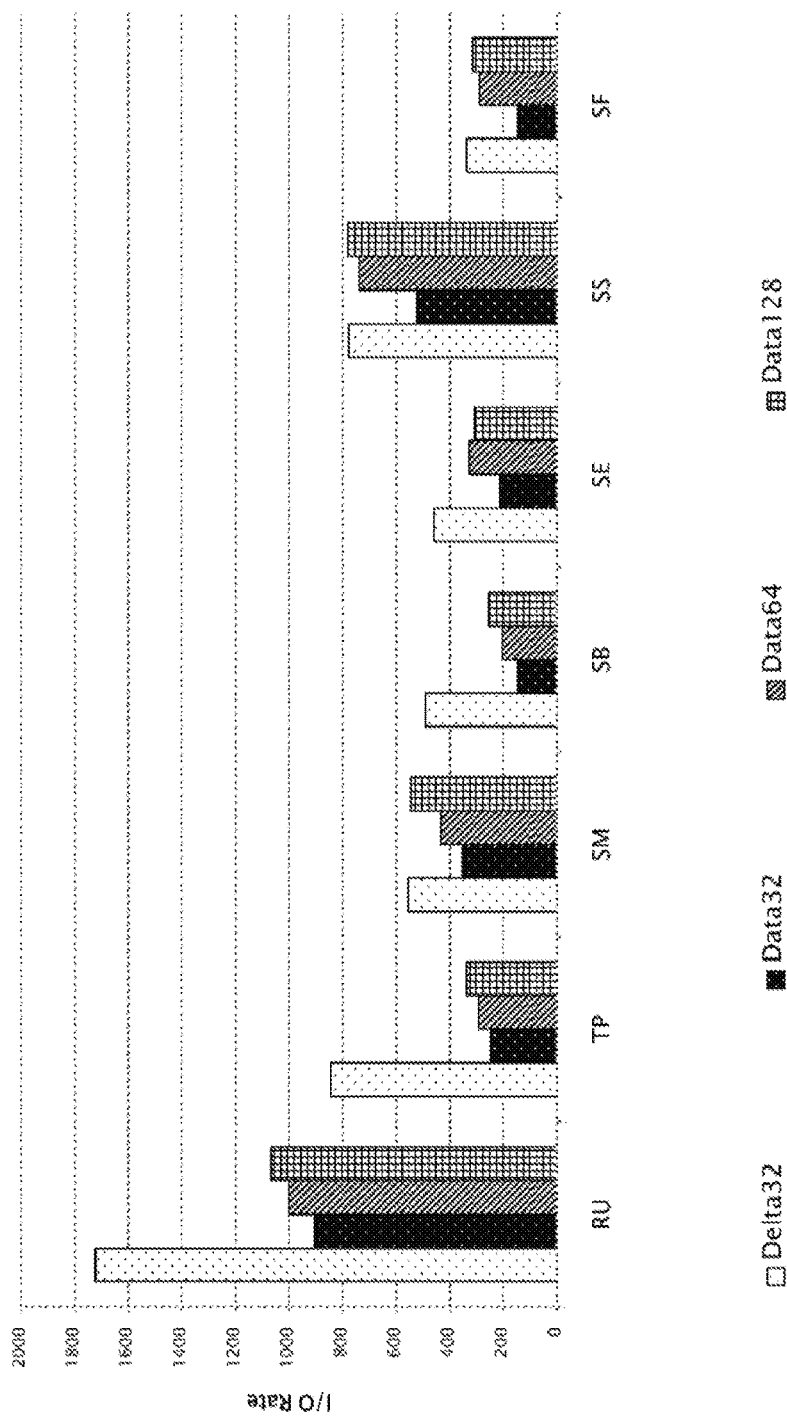
FIG. 20 is a bar graph showing a comparison of average RAM cache I/O rates of delta caching by the system of FIG. 12 and data block caching in a DRAM buffer.

The prototype of the tested embodiment of the invention uses a part of the system RAM (32 MB) as the DRAM buffer that was supposed to be on a hardware controller board. As discussed previously, there are tradeoffs in managing this DRAM buffer regarding what to cache in the buffer. To quantitatively evaluate the performance impacts of caching different types of data, the I/O rate of the benchmarks was measured by changing the cache contents. FIG. 20 shows the measured performance results for four different cases: 32 MB cache to store deltas, 32 MB cache to store data, 64 MB cache to store data, and 128 MB to store data. As shown in the figure, caching delta is always better than caching data themselves although additional computations are required. For RUBiS benchmark that shows strong content locality, using 128 MB RAM to cache data performs worse than using 32 MB to cache deltas, which clearly shows the benefit of the tested embodiment of the invention.

Figure 21:
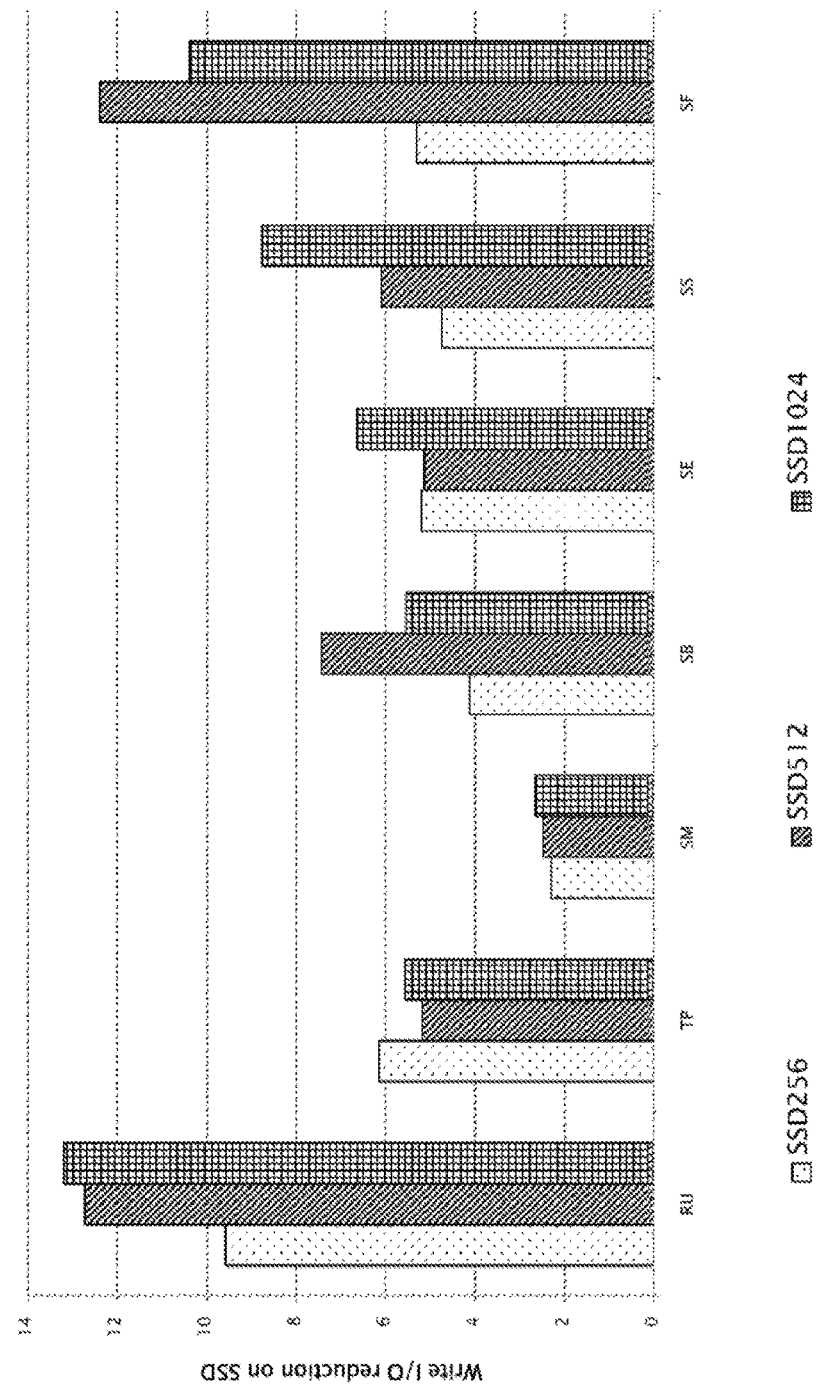
FIG. 21 is a bar graph showing run time write I/O reductions to an SSD.

Finally, the average write I/O reductions of the tested embodiment of the invention were measured as compared to the baseline system. Recall that the preliminary prototype does not strictly disallow random writes to SSD as would have been done by a hardware implementation of the tested embodiment of the invention. Some independent blocks that do not have reference blocks with deltas smaller than the threshold value (768 byte in the current implementation) are written directly to the SSD if there is space available. Nevertheless, random writes to SSD are still substantially smaller than the baseline system. FIG. 21 shows the ratio of the number of SSD writes of the baseline system to the number of writes of the I-CASH. The write reduction ranges from a factor of 2 to an order of magnitude. Such write I/O reductions imply prolonged life time of the SSD as discussed previously.

A novel data storage architecture has been presented exploiting the two emerging semiconductor technologies, flash memory SSD and multi-core GPU/CPU. The idea of the new disk I/O architecture is intelligently coupling an array of SSDs and HDDs in such a way that read I/Os are done mostly in SSD and write I/Os are done in HDD in batches by packing deltas derived with respect to the reference blocks stored in the SSD.

By making use of the supercomputing performance of GPU/CPU and exploiting regularity and content locality of I/O data blocks, preferred embodiments of the invention replace mechanical operations in HDDs with high speed computations. A preliminary prototype realizing partial functionality of an embodiment of the invention has been built on Linux OS to provide a proof-of-concept of an embodiment of the invention. Performance evaluation experiments using standard I/O intensive benchmarks have shown great performance potential of an embodiment of the invention with up to 4 times performance improvement over traditional systems using SSD as a storage cache. It is expected that embodiments of the invention will dramatically improve data storage performance with fine tuned implementations and greatly prolong the life time of SSDs that are otherwise wearing quickly with random write operations.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

The invention claimed is:

1. A system for storing and retrieving data, comprising:
   a host computer;
   at least a first solid state memory drive;
   at least a first random access memory cache;
   at least a first hard disk drive;
   an intelligent processing unit, wherein the intelligent processing unit is coupled with the host computer, wherein the first solid state memory drive is coupled with the intelligent processing unit, wherein the first random access memory cache is coupled with the intelligent processing unit, wherein the first hard disk drive is coupled with the intelligent processing unit;

wherein the intelligent processing unit is operable to respond to a first read request from the host computer to read a data block within a pre-defined window;

wherein the intelligent processing unit is operable to search for a first reference block stored in the first solid state memory drive corresponding to the data block;

wherein the intelligent processing unit is operable to locate the first reference block corresponding to the data block on the first solid state memory drive;

wherein the intelligent processing unit is operable to locate a first delta corresponding to the data block from at least one of the first random access memory cache and a delta block stored on the first hard disk drive;

wherein the intelligent processing unit is operable to combine the first delta and the first reference block to form the requested data block;

wherein the intelligent processing unit is operable to return the requested data block to the host computer;

wherein the intelligent processing unit is operable to determine whether each of a plurality of additional read requests received within the pre-defined window is addressed to an additional data block having a corresponding second delta that is stored in the same delta block on the hard disk drive as the first delta; and wherein the intelligent processing unit is operable to combine each of the plurality of additional read requests determined to be addressed to an additional data block having a corresponding second delta that is stored in the same delta block on the hard disk drive as the first delta with the first read request to perform a single hard disk drive operation, wherein the first delta and the second delta are stored in the same delta block based on a temporal locality of access for the first data block and the additional data block.

2. The system of claim 1, wherein the intelligent processing unit is further operable to locate an independent data block, in at least one of the first solid state memory drive and the first hard disk drive, as the requested data block, when there is no reference block stored in the first solid state memory drive corresponding to the requested data block.

3. The system of claim 2, wherein the intelligent processing unit is further operable to return the independent data block to the host computer.

4. The system of claim 1, wherein the intelligent processing unit comprises at least one of a multi-core microprocessor or a graphics processing unit.

5. The system of claim 1, wherein the delta block is not stored on the first solid state memory drive, and wherein the first reference block is not stored on the first hard disk drive.

6. The system of claim 1, wherein the intelligent processing unit is operable to advance the pre-defined window forward and identify a plurality of read requests in the advanced window that each has a corresponding delta stored in a same delta block.

7. The system of claim 6, wherein the intelligent processing unit is operable to combine the identified plurality of read requests to perform a single hard disk drive operation.

8. The system of claim 1, wherein the intelligent processing unit is further operable to periodically update reference blocks stored in the flash memory.

9. A system for storing and retrieving data, comprising:
a host computer;
a storage controller, the storage controller comprising a host interface, a flash memory, a random access memory cache, a hard disk drive interface, and an intelligent processing unit, wherein the host interface is coupled with the host computer, wherein the intelligent processing unit is coupled with the host interface, wherein the flash memory is coupled with the intelligent processing unit, wherein the random access memory cache is coupled with the intelligent processing unit, wherein the hard disk drive interface is coupled with the intelligent processing unit, wherein the hard disk drive interface is coupled with a hard disk drive;

wherein the intelligent processing unit is operable to respond to a first read request to read from the host computer a data block within a pre-defined window;

wherein the intelligent processing unit is operable to search for a first reference block stored in the flash memory corresponding to the data block;

wherein the intelligent processing unit is operable to locate the first reference block corresponding to the data block in the flash memory;

wherein the intelligent processing unit is operable to locate a first delta corresponding to the data block from at least one of the random access memory cache and a delta block stored on the hard disk drive;

wherein the intelligent processing unit is operable to combine the first delta and the first reference block to form the requested data block;

wherein the intelligent processing unit is operable to return the requested data block to the host computer;

wherein the intelligent processing unit is operable to determine whether each of a plurality of additional read requests received within the pre-defined window is addressed to an additional data block having a corresponding second delta that is stored in the same delta block on the hard disk drive as the first delta; and wherein the intelligent processing unit is operable to combine each of the plurality of additional read requests determined to be addressed to an additional data block having a corresponding second delta that is stored in the same delta block on the hard disk drive as the first delta with the first read request to perform a single hard disk drive operation, wherein the first delta and the second delta are stored in the same delta block based on a temporal locality of access for the first data block and the additional data block.

10. The system of claim 9, wherein the intelligent processing unit is further operable to locate an independent data block, in at least one of the flash memory and the hard disk drive, as the requested data block, when there is no reference block stored in the flash memory corresponding to the requested data block.

11. The system of claim 10, wherein the intelligent processing unit is further operable to return the independent data block to the host computer.

12. The system of claim 9, wherein the intelligent processing unit is further operable to periodically update reference blocks stored in the flash memory.

13. The system of claim 9, wherein the intelligent processing unit is at least one of a multi-core microprocessor and a graphic processing unit.

14. The system of claim 9, wherein the intelligent processing unit is operable to advance the pre-defined window forward and identify a plurality of read requests in the advanced window that each has a corresponding delta stored in a same delta block and to combine the identified plurality of read requests to perform a single hard disk drive operation.

15. A method for storing and retrieving data, comprising:
an intelligent processing unit receiving a first read request from a host computer to read a data block within a pre-defined window;
the intelligent processing unit searching for a first reference block stored in a solid state memory drive corresponding to the data block;
the intelligent processing unit locating the first reference block corresponding to the data block on the solid state memory drive;
the intelligent processing unit locating a first delta corresponding to the data block from at least one of a random access memory cache and a delta block stored on a hard disk drive;
the intelligent processing unit combining the first delta and the first reference block to form the requested data block;
the intelligent processing unit returning the requested data block to the host computer;
the intelligent processing unit determining whether each of a plurality of additional read requests received within the pre-defined window is addressed to an additional data block having a corresponding second delta that is stored in the same delta block on the hard disk drive as the first delta; and
the intelligent processing unit combining each of the plurality of additional read requests determined to be addressed to an additional data block having a corresponding second delta that is stored in the same delta block on the hard disk drive as the first delta with the first read request to perform a single hard disk drive operation, wherein the first delta and the second delta are stored in the same delta block based on a temporal locality of access for the first data block and the additional data block.

16. The method of claim 15, further comprising: the intelligent processing unit locating an independent data block, in at least one of the solid state memory drive and the hard disk drive, as the requested data block, when there is no reference block stored in the solid state memory drive corresponding to the requested data block.

17. The method of claim 16, further comprising: the intelligent processing unit returning the independent data block to the host computer.

18. The method of claim 15, further comprising: the intelligent processing advancing the pre-defined window forward; and identifying a plurality of read requests in the advanced window that each has a corresponding delta stored in a same delta block; and combining the identified plurality of read requests to perform a single hard disk drive operation.

19. The method for storing and retrieving data as claimed in claim 15, further comprising: the intelligent processing unit updating periodically reference blocks stored in the flash memory.

20. The method of claim 15, wherein the intelligent processing unit is at least one of a multi-core microprocessor and a graphic processing unit.

* * * * *